US009744670B2

(12) United States Patent
Romanov et al.

(10) Patent No.: US 9,744,670 B2
(45) Date of Patent: Aug. 29, 2017

(54) SYSTEMS AND METHODS FOR USE OF OPTICAL ODOMETRY SENSORS IN A MOBILE ROBOT

(71) Applicant: iRobot Corporation, Bedford, MA (US)

(72) Inventors: Nikolai Romanov, Oak Park, CA (US); James Philip Case, Los Angeles, CA (US); Kenneth Griest, Gardner, MA (US); David O. Swett, Waltham, MA (US)

(73) Assignee: iRobot Corporation, Bedford, MA (US)

( * ) Notice: Subject to any disclaimer, the term of this patent is extended or adjusted under 35 U.S.C. 154(b) by 19 days.

(21) Appl. No.: 14/856,501

(22) Filed: Sep. 16, 2015

(65) Prior Publication Data

US 2016/0144511 A1 May 26, 2016

Related U.S. Application Data

(60) Provisional application No. 62/085,002, filed on Nov. 26, 2014.

(51) Int. Cl.
*G01C 22/00* (2006.01)
*G05D 1/00* (2006.01)
(Continued)

(52) U.S. Cl.
CPC ............ *B25J 9/1697* (2013.01); *G05D 1/027* (2013.01); *G05D 1/0253* (2013.01);
(Continued)

(58) Field of Classification Search
CPC ..... B25J 9/1697; G05D 1/0253; G05D 1/027; G05D 2201/0203; G05B 2219/50393; Y10S 901/01; Y10S 901/47
(Continued)

(56) References Cited

U.S. PATENT DOCUMENTS 5,642,106 A * 6/1997 Hancock ................ G01C 21/12
250/203.6
5,696,675 A 12/1997 Nakamura et al.
(Continued)

FOREIGN PATENT DOCUMENTS

EP 2497708 A1 9/2012
GB 2404330 A 2/2005
(Continued)

OTHER PUBLICATIONS

International Search Report Corresponding to International Application No. PCT/US2015/061146; Date of Mailing: Feb. 17, 2016; 13 Pages.
(Continued)

*Primary Examiner* — Jaime Figueroa
(74) *Attorney, Agent, or Firm* — Myers Bigel, P.A.

(57) ABSTRACT

Systems and methods for use of optical odometry sensor systems in a mobile robot. The optical odometry sensor system is positioned within a recessed structure on an underside of the mobile robot body and configured to output optical odometry data. The optical odometry sensor system includes an optical odometry camera that includes a telecentric lens configured to capture images of a tracking surface beneath the body and having a depth of field that provides a range of viewing distances at which a tracking surface is captured in focus from a first distance within the recessed structure to a second distance below the underside of the mobile robot body.

18 Claims, 14 Drawing Sheets

(51) Int. Cl.
*B25J 9/16* (2006.01)
*G05D 1/02* (2006.01)

(52) U.S. Cl.
CPC .............. *G05B 2219/50393* (2013.01); *G05D 2201/0203* (2013.01); *Y10S 901/01* (2013.01); *Y10S 901/47* (2013.01)

(58) Field of Classification Search
USPC ...................................................... 701/1, 28
See application file for complete search history.

(56) References Cited

U.S. PATENT DOCUMENTS

| | | | |
|---|---|---|---|
| 6,301,524 | B1 | 10/2001 | Takenaka |
| 6,389,329 | B1 | 5/2002 | Colens |
| 6,496,754 | B2 | 12/2002 | Song et al. |
| 6,532,404 | B2 | 3/2003 | Colens |
| 6,594,844 | B2 | 7/2003 | Jones |
| 6,611,120 | B2 | 8/2003 | Song et al. |
| 6,690,134 | B1 | 2/2004 | Jones et al. |
| 6,732,826 | B2 | 5/2004 | Song et al. |
| 6,781,338 | B2 | 8/2004 | Jones et al. |
| 6,809,490 | B2 | 10/2004 | Jones et al. |
| 6,868,307 | B2 * | 3/2005 | Song ............... A47L 9/009 318/568.1 |
| 6,957,712 | B2 | 10/2005 | Song et al. |
| 6,965,209 | B2 | 11/2005 | Jones et al. |
| 7,155,308 | B2 | 12/2006 | Jones |
| 7,171,285 | B2 | 1/2007 | Kim et al. |
| 7,173,391 | B2 | 2/2007 | Jones et al. |
| 7,196,487 | B2 | 3/2007 | Jones et al. |
| 7,388,343 | B2 | 6/2008 | Jones et al. |
| 7,389,156 | B2 | 6/2008 | Ziegler et al. |
| 7,448,113 | B2 | 11/2008 | Jones et al. |
| 7,571,511 | B2 | 8/2009 | Jones et al. |
| 7,636,982 | B2 | 12/2009 | Jones et al. |
| 7,761,954 | B2 | 7/2010 | Ziegler |
| 7,774,158 | B2 | 8/2010 | Domingues Goncalves et al. |
| 8,086,419 | B2 | 12/2011 | Goncalves et al. |
| 8,095,336 | B2 | 1/2012 | Goncalves et al. |
| 8,150,650 | B2 | 4/2012 | Goncalves et al. |
| 8,800,101 | B2 * | 8/2014 | Kim ............... A47L 9/2805 15/319 |
| 9,026,302 | B2 | 5/2015 | Stout et al. |
| 9,188,983 | B2 | 11/2015 | Stout et al. |
| 2002/0016649 | A1 | 2/2002 | Jones |
| 2002/0120364 | A1 | 8/2002 | Colens |
| 2003/0007023 | A1 | 1/2003 | Barclay et al. |
| 2003/0025472 | A1 | 2/2003 | Jones et al. |
| 2004/0016077 | A1 | 1/2004 | Song et al. |
| 2004/0020000 | A1 | 2/2004 | Jones |
| 2004/0049877 | A1 | 3/2004 | Jones et al. |
| 2004/0088080 | A1 * | 5/2004 | Song ............... A47L 9/009 700/259 |
| 2004/0158357 | A1 | 8/2004 | Lee et al. |
| 2004/0187457 | A1 | 9/2004 | Colens |
| 2004/0207355 | A1 | 10/2004 | Jones et al. |
| 2004/0221790 | A1 * | 11/2004 | Sinclair ............ G01C 22/02 116/62.1 |
| 2005/0067994 | A1 | 3/2005 | Jones et al. |
| 2005/0168720 | A1 | 8/2005 | Yamashita |
| 2005/0192707 | A1 | 9/2005 | Park et al. |
| 2005/0204717 | A1 | 9/2005 | Colens |
| 2006/0056677 | A1 | 3/2006 | Tani |
| 2006/0061657 | A1 | 3/2006 | Rew et al. |
| 2007/0061040 | A1 * | 3/2007 | Augenbraun ........ A47L 5/225 700/245 |
| 2007/0266508 | A1 | 11/2007 | Jones et al. |
| 2008/0140255 | A1 | 6/2008 | Ziegler et al. |
| 2008/0155768 | A1 | 7/2008 | Ziegler et al. |
| 2008/0211815 | A1 | 9/2008 | Gordon |
| 2008/0307590 | A1 | 12/2008 | Jones et al. |
| 2009/0281661 | A1 * | 11/2009 | Dooley ............. B60L 3/106 700/258 |
| 2010/0049365 | A1 | 2/2010 | Jones et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2011/0202175 | A1 * | 8/2011 | Romanov .......... A47L 11/4011 700/250 |
| 2012/0038549 | A1 | 2/2012 | Mandella et al. |
| 2012/0121161 | A1 | 5/2012 | Eade et al. |
| 2013/0025085 | A1 * | 1/2013 | Kim ............... A47L 9/2805 15/319 |
| 2013/0030750 | A1 * | 1/2013 | Kim ............... G06N 3/004 702/108 |
| 2013/0226344 | A1 * | 8/2013 | Wong ............... G05D 1/024 700/258 |
| 2013/0331987 | A1 | 12/2013 | Karlsson et al. |
| 2014/0028805 | A1 | 1/2014 | Tohme |
| 2014/0233935 | A1 | 8/2014 | Wada et al. |
| 2014/0244038 | A1 | 8/2014 | Karlsson et al. |
| 2015/0049004 | A1 | 2/2015 | Deering |
| 2015/0219437 | A1 | 8/2015 | Dowski |
| 2016/0101523 | A1 | 4/2016 | Stout et al. |

FOREIGN PATENT DOCUMENTS

| | | |
|---|---|---|
| JP | H 0816241 A | 1/1996 |
| JP | 2002085305 A | 3/2002 |
| JP | 2004033340 A | 2/2004 |
| JP | 2005230044 A | 9/2005 |
| JP | 2005352707 A | 12/2005 |
| JP | 2007209392 A | 8/2007 |
| KR | 10-2004-0039093 A | 5/2004 |
| KR | 10-2004-0086940 A | 10/2004 |
| KR | 10-2012-0125085 A | 11/2012 |
| KR | 20120125085 A * | 11/2012 ............ B25J 5/00 |
| KR | 10-1324166 B1 | 11/2013 |

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

"Welcome to the Electrolux Trilobite," Electrolux, accessed online <http://electroluxusa.com/node57.asp?currentURL=node142. asp%3F> Mar. 18, 2005, 2 pages.

Aly, Mohammed, et al., CompactKdt: Compact Signatures for Accurate Large Scale Object Recognition, IEEE Workshop on Applications of Computer Vision (WACV), Colorado, Jan. 2012, pp. 505-512.

Andersen et al., "Landmark based navigation strategies," SPIE Conference on Mobile Robots XIII, SPIE vol. 3525, pp. 170-181, Jan. 8, 1999.

Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.

Facchinetti Claudio et al., "Self-Positioning Robot Navigation Using Ceiling Images Sequences," ACCV '95, 5 pages, Dec. 1995.

Fukuda et al. "Navigation System based on Ceiling Landmark Recognition for Autonomous mobile robot,", Proceedings of the IECON 93, International Conference on Industrial Electronics, Control, and Instrumentation, 1993, Nov. 15-19, 1993, vol. 3, pp. 1466-1471, Maui, HI.

Fukuda et al. "Construction mechanism of group behavior with cooperation", 1995 IEEE/RSJ International Conference on Intelligent Robots and Systems 95. 'Human Robot Interaction and Cooperative Robots', Aug. 5-9, 1995, vol. 3, pp. 535-542, Pittsburgh, PA.

Goel, Dhiraj, et al., "Systematic Floor Coverage of Unknown Environments Using Rectangular Regions and Localization Certainty", 2013 IEEE/RSJ International Conference on Intelligent Robots and Systems (IROS 2013), Tokyo, Japan, Nov. 3-7, 2013, pp. 1-8.

Goncalves, Luis, et al., A Visual Front-end for Simultaneous Localization and Mapping, Proceedings of the 2005 IEEE International Conference on Robotics and Automation, Barcelona, Spain, Apr. 2005, pp. 44-49.

(56) References Cited

OTHER PUBLICATIONS

Gutmann, Jens-Steffen, et al., A Constant-Time Algorithm for Vector Field SLAM Using an Exactly Sparse Extended Information Filter, IEEE Transactions on Robotics (vol. 28, Issue: 3), Jan. 2, 2012, pp. 650-667.
Gutmann, Jens-Steffen, et al., Challenges of designing a low-cost indoor localization system using active beacons, Technologies for Practical Robot Applications (TePRA), 2013 IEEE International Conference on, Apr. 22-23, 2013, pp. 1-6.
Gutmann, Jens-Steffen, et al., Localization in a vector field map, 2012 IEEE/RSJ International Conference on Intelligent Robots and Systems, pp. 3144-3151.
Gutmann, Jens-Steffen, et al., The Social Impact of a Systematic Floor Cleaner, Advanced Robotics and its Social Impacts (ARSO), 2012 IEEE Workshop on, 2012, pp. 50-53.
Gutmann, Jens-Steffen, et al., Vector Field SLAM, IEEE Transactions on Robotics, 2012, pp. 650-667.
Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.
Hom-Bot Owner's Manual, LG, Apr. 11, 2013, 38 pages.
Honda Motor Co., Ltd., English Translation of JP11212642, Aug. 6, 1999, 31 pages.
Jeong, WooYeon et al., CV-SLAM: A new Ceiling Vision-based SLAM technique, 2005 IEEE/RSJ International Conference on Intelligent Robots and Systems, Aug. 2-6, 2005, pp. 3195-3200.
Karcher RC 3000 Robotic Cleaner, Product page, accessed online <http://www.karcher-usa.com/showproducts.php?op=view_prod&param1=143&param2=&param3=> Mar. 18, 2005, 3 pages.
Karcher RoboCleaner RC 3000, Dec. 12, 2003, 4 pages.
Karcher, Product Manual Download, 2003, 16 pages.
Karlsson et al, "Core Technologies for service Robotics," IEEEIRSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, Niklas et al., The vSLAM Algorithm for Navigation in Natural Environments, Korean Robotics Society Review, vol. 2, No. 1, pp. 51-67, 2005.
Knights, et al., "Localization and Identification of Visual Landmarks," Journal o/Computing Sciences in Colleges, 16(4):312-313, May 2001.
Lang et al., "Visual Measurement of Orientation Using Ceiling Features", IMTC 1994 IEEE, pp. 552-555, May 10-12, 1994.
Maschinemarkt Wurzburg 105, No. 27, pp. 3, 30, Jul. 5, 1999 (with English Translation).
Miro et al., "Towards Vision Based Navigation in Large Indoor Environments," 2006 Proceedings of the IEEE/RSJ, International Conferences on Intelligent Robots and Systems, Oct. 9-15, 2006, Beijing, China.
Munich, M. E., et al., SIFT-ing Through Features with ViPR, IEEE Robotics & Automation Magazine, Sep. 2006, pp. 72-77.
Munich, M.E., et al., Application of Visual Pattern Recognition to Robotics and Automation. IEEE Robotics & Automation Magazine, pp. 72-77, 2006.
Prassler, et al., English Translation of DE19849978, Feb. 8, 2001, 16 pages.
Roboking Owner's Manual, LG, Apr. 11, 2013, 36 pages.
Sim et al, "Learning Visual Landmarks for Pose Estimation," IEEE International Conference on Robotics and Automation, vol. 3, Detroit, MI, pp. 1972-1978, May 1999.
Stevens, Tim, Samsung's Tango robot vacuum uses cameras to clean your floors, duvet covers, engadget [online] <http://www.engadget.com/2009/11/05/samsungs-tango-robot-vacuum-uses-cameras-to-clean-your-floors/> Nov. 5, 2009.
Yamamoto, Yutaka, et al., Optical Sensing for Robot Perception and Localization, IEEE Workshop on Advanced Robotics and its Social Impacts, 2005, Jun. 12-15, 2005, pp. 14-17.

\* cited by examiner

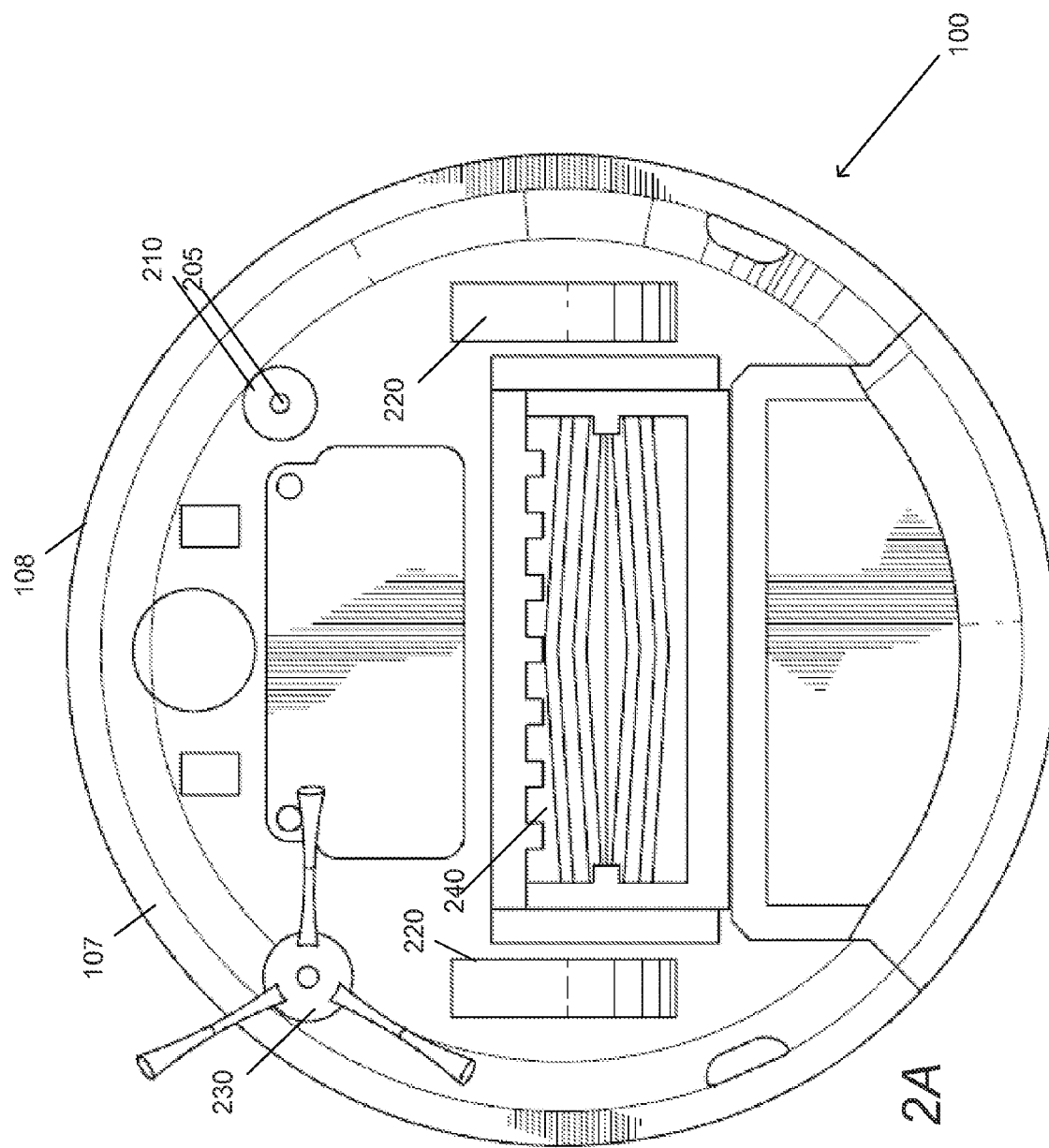

SYSTEMS AND METHODS FOR USE OF OPTICAL ODOMETRY SENSORS IN A MOBILE ROBOT

RELATED APPLICATION(S)

The present application claims the benefit of and priority from U.S. Provisional Patent Application No. 62/085,002, filed Nov. 26, 2014, entitled "Systems And Methods For Use of Optical Odometry Sensors In A Mobile Robot" the disclosure of which is incorporated herein by reference in its entirety.

TECHNICAL FIELD

Systems and methods for providing an optical odometry sensor system for capturing odometry data for use by a mobile robot or described herein.

BACKGROUND

Many robots are electro-mechanical machines, which are controlled by a computer. Mobile robots have the capability to move around in their environment and are not fixed to one physical location. An example of a mobile robot that is in common use today is an automated guided vehicle or automatic guided vehicle (AGV). An AGV is typically considered to be a mobile robot that follows markers or wires in the floor, or uses a vision system or lasers for navigation. Mobile robots can be found in industry, military and security environments. They also appear as consumer products, for entertainment or to perform specific tasks such as vacuum cleaning and home assistance.

In order to achieve full autonomy, a mobile robot needs to possess the ability to explore its environment without user-intervention. Mobile robots rely on information collected from various different sensors in order to navigate an environment. Many mobile robots rely on wheel odometers in order to obtain odometry data, which may include information regarding a distance travelled by the mobile robot. Wheel odometers generally measure the accumulated rotation of the wheels to determine the distance traveled. Such a direct-mechanical-contact method of odometry is reliable in applications where direct no-slip mechanical contact is reliably maintained between the mobile robot (wheels, treads, etc.) and the surface. However, maintaining this no-slip contact becomes difficult on certain types of surfaces that may be frequently encountered by mobile robots, including deep carpets, slippery surfaces, dirt or sand environments, among other similar types of surfaces.

SUMMARY OF THE INVENTION

The present invention provides a mobile robot configured to navigate an operating environment, that includes a body containing a drive configured to translate the robot in a direction of motion; at least one processor; memory containing a navigation application; an optical odometry sensor system positioned within a recessed structure on an underside of the body and configured to output optical odometry data, where the optical odometry sensor system includes an optical odometry camera including a telecentric lens configured to capture images of a tracking surface beneath the body and having a depth of field that provides a range of viewing distances at which a tracking surface is captured in focus from a first distance within the recessed structure to a second distance below the underside of the mobile robot body; and a gyroscope configured to output gyroscope measurement data.

In several embodiments, the navigation application directs the processor to actuate the drive mechanism and capture optical odometry data from the optical odometry sensor system and gyroscope measurement data from the gyroscope sensor system; estimate a distance travelled using the captured optical odometry data; estimate a direction travelled using the gyroscope measurement data; and update a pose estimate using the estimated distance travelled and direction travelled.

In several embodiments, the navigation application directs the processor to estimate a distance travelled using captured wheel odometry data.

In a number of embodiments, the navigation application directs the processor to compare the pose estimate against a VSLAM pose determination calculated using imaged features detected by an camera mounted under a top surface of the mobile robot.

In certain embodiments, the navigation application directs the processor to reset the pose estimate if the VLSAM pose determination indicates the mobile robot has drifted from a heading.

In several embodiments, the telecentric lens has a depth of field in which objects are in focus at distances including distances between negative 5 to 20 mm from a bottom surface of the robot body.

In numerous embodiments, the mobile robot includes a plurality of lighting elements disposed about the telecentric lens and including several LEDs for illuminating the tracking surface.

In certain embodiments, each of the several LEDs are positioned at an acute angle relative to the optical axis of the camera In some embodiments, the several LEDs include at least four LEDs positioned at different positions around the camera.

In some embodiments, pairs of LEDs are positioned on opposite sides relative to the camera.

In some embodiments, the LEDs are positioned in a spiral pattern offset from the optical axis of the camera.

In several embodiments, the drive mechanism includes several wheels and the mobile robot further includes a wheel odometry sensor system that outputs wheel odometry data based upon rotation of each of the plurality of wheels.

In some embodiments, the optical odometry sensor system also outputs a quality measure, where the quality measure indicates the reliability of optical odometry data; and the navigation application directs the processor to estimate a distance travelled using the captured optical odometry data, when a quality measure satisfies a threshold.

In certain embodiments, the quality measure is based on a number of valid features detected in an image.

Some embodiments of the invention provide a mobile robot configured to navigate an operating environment, including: a body containing: a drive configured to translate the robot in a direction of motion; at least one processor; memory containing a navigation application; an optical odometry sensor system positioned within a recessed structure on an underside of the body and configured to output optical odometry data, where the optical odometry sensor system comprises an optical odometry camera positioned at a height between 40 to 60 mm from the floor surface, the optical odometry camera including a telecentric lens configured to capture images of a tracking surface beneath the body and having a depth of field in which objects are in focus at distances including distances between negative 5 to 20 mm from a bottom surface of the robot body; and a gyroscope configured to output gyroscope measurement data.

In some embodiments, the recessed structure has an opening with a diameter between 10 mm and 40 mm.

In several embodiments, the body includes a top surface that is at most 110 mm from the floor surface.

In a number of embodiments, the depth of field of the optical odometry camera is proportional to a focal length of the optical odometry camera.

In certain embodiments, the focal length of the optical odometry camera is between 15 to 25 mm.

In some embodiments, the mobile robot further includes four LEDs disposed about the telecentric lens for illuminating the tracking surface.

In certain embodiments, each LED is angles between 10 to 20 degrees from vertical.

Several embodiments of the invention provide a method for determining a location of a mobile robot within an environment, the method including: receiving sensor data from a wheel odometry sensor system, an optical odometry sensor system and an inertial measurement unit (IMU) sensor system; comparing data from the wheel odometry sensor system with data from the IMU sensor system; comparing data from the optical odometry sensor system with data from the IMU sensor system; identify a reliable set of data based on the comparisons; and determine a location of the mobile robot based on the set of data.

In some embodiments, comparing data from the wheel odometry sensor system with the IMU sensor system includes determining whether the data received from the wheel odometry sensor system conflicts with the data received from the IMU sensor system.

In certain embodiments, the method further includes identifying, when the data received from the wheel odometry sensor system conflicts with the data received from the IMU sensor system, the data from the wheel odometry sensor system as unreliable.

In some embodiments, the method further includes determining whether the data from the IMU sensor system indicates drift and, when the data indicates drift, identifying the data from the wheel odometry system as unreliable.

In certain embodiments, the method further includes determining whether the data from the IMU sensor system indicates drift and, when the data does not indicate drift, determining the location of the mobile robot based on data from both the wheel odometry sensor system and the optical sensor system.

In certain embodiments, comparing data from the optical odometry sensor system with the IMU sensor system includes determining whether a SQUAL value of the data provided by the optical odometry sensor system is above a threshold.

In some embodiments, determining the location of the mobile robot includes using a VSLAM sensor.

BRIEF DESCRIPTION OF THE DRAWINGS

FIG. 2A is a bottom view of a mobile robot incorporating an optical odometry camera.

DETAILED DESCRIPTION

Figure 1:
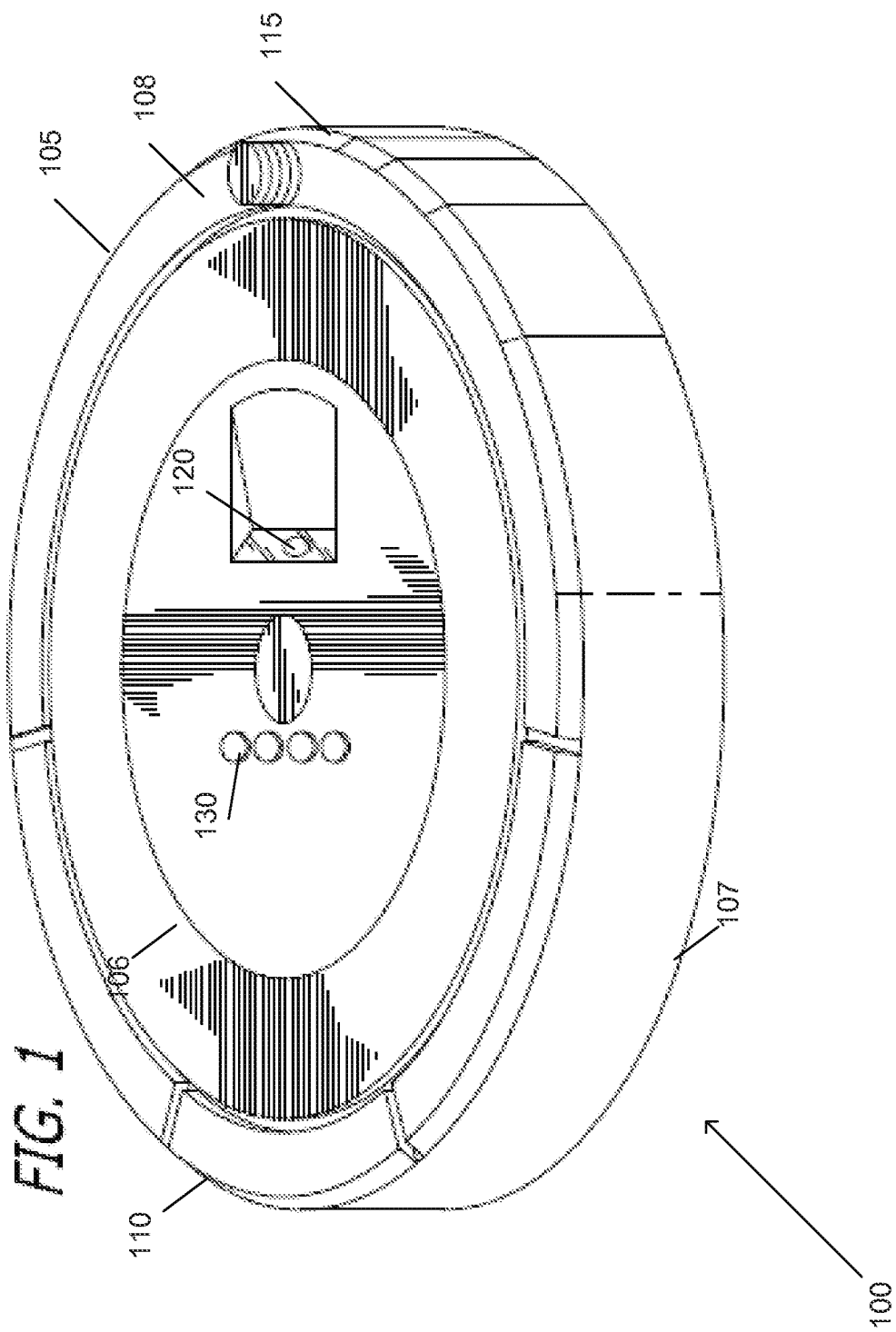
FIG. 1 is a front perspective view of a mobile robot incorporating an optical odometry camera.

Turning now to the drawings, systems and methods for obtaining odometry data using an optical odometry sensor system 205 contained within a recessed structure 210 of a mobile robot 100 are illustrated. The mobile robot 100 can utilize an optical odometry sensor system 205 to perform dead reckoning. Dead reckoning is a process involving calculating the mobile robot's current position based upon a previously determined position and information about the movement of the mobile robot 100. The mobile robot 100 can use an optical odometry sensor system 205 to obtain odometry data, which may include different types of information used for dead-reckoning, including (but not limited to) distance traveled, direction of travel, velocity, and/or acceleration. The optical odometry sensor system 205 can optionally include one or more optical odometry cameras 440 (i.e., mouse cameras) that capture images of a surface over which the mobile robot 100 traverses. In another optional aspect of the invention, the optical odometry sensor system 205 includes one or more illumination sources that illuminate a tracking surface visible to an optical odometry camera 440. In a further optional aspect of the invention, the optical odometry camera 440 can operate at a frame rate of over one thousand frames per second, capturing an image of a tiny patch of the tracking surface. The optical odometry sensor system 205 continuously compares each image captured by the optical odometry camera 440 to the one before it and estimates the relative motion of the mobile robot 100 based upon observed optical flow.

In order to capture images of the surface, the one or more optical odometry cameras 440 may be located on an underside of the mobile robot body 108 and aimed toward the floor surface below the mobile robot 100. Optical odometry sensors used in common applications, such as the optical odometry systems used in optical computer mice, typically assume that the optical odometry camera 440 is located a fixed distance from the tracking surface and utilize optical odometry cameras 440 with shallow depths of field. In many applications, the mobile robot 100 is configured to navigate over a variety of different surfaces and the assumption that tracking surface remains at a fixed distance from optical odometry camera 440 is not valid. As the mobile robot 100 navigates transitions between different surface types, the mobile robot body 108 may tilt, increasing the distance between the optical odometry camera 440 and the tracking surface. The same is also true when the mobile robot 100 navigates over uneven surfaces. When the mobile robot 100 navigates across compressible surfaces, such as (but not limited to) plush carpet piles, the wheels of the mobile robot 100 may sink into the compressible surface and decrease the distance between the optical odometry camera 440 and the tracking surface. Furthermore, the distance between the underside of the mobile robot 100 and a compressible surface such as a carpet pile may continuously change, with the carpet fibers generally closer to the camera compared to a flat floor. Accordingly, the body 108 of the mobile robot 100 can optionally include a recessed structure in the underside of the mobile robot body 108 that contains an optical odometry camera 440 and associated illumination source. Recessing the optical odometry camera 440 enables the use of an optical odometry camera 440 with a wider depth of field, which enables the optical odometry camera to capture in focus images of tracking surfaces at a comparatively wide range of distances from the optical odometry camera 440 encompassing the range of distances at which a tracking surface is likely to be encountered during the operation of the mobile robot 100 in a specific application. The depth of field of a camera configuration specifies a range of distances between which images may be captured while still in-focus or within an acceptable range out of focus. Objects that lie outside of this acceptable range may not be useful for use in calculating odometry data. In particular, the optical odometry sensor system 205 may not be able to detect the displacement of trackable features between images when the images are beyond an acceptable focus range. In one optional configuration, the depth of field of the optical odometry camera 440 spans a range of distances including distances in which at least a portion of the tracking surface extends within the recessed structure containing the optical odometry camera 440.

In several applications, the mobile robot 100 is configured as a house cleaning robot 100 having a top surface 106 not more than 4 inches (or about 110 mm) from the floor surface and having a bottom surface 107 riding not more than about half an inch (or about 10 mm) above a floor surface. The bottom surface 107, or underside, of the robot 100 is located relatively close to the floor surface on which the mobile robot rests. In this configuration, the mobile robot 100 can be configured using a recessed optical odometry camera 440 with a telecentric lens 442 having a depth of field ranging from approximately 20 millimeters to 40 millimeters from the camera. This range of distances allows for in-focus images to be captured for surfaces at a height similar to a hardwood floor (e.g., approx. 20-30 mm below the camera) and surfaces at a height of a carpet (e.g., approx. 5-20 mm below the camera). The depth of field of the optical odometry camera 440 can also accommodate increases in the distance between the optical odometry camera 440 and the floor surface, or tracking surface, due to unevenness of the floor surface and/or the mobile robot 100 traversing transitions between surfaces at different heights.

In certain optional configurations of the mobile robot 100, the optical odometry camera 440 uses a telecentric lens 442 to capture images of the tracking surface. Telecentric lenses are typically characterized by providing constant magnification of objects independent of distance. The use of a telecentric lens enables the optical odometry sensor system 205 to precisely determine optical flow of features on a tracking surface in a manner that is independent of the distance of the tracking surface from the optical odometry camera 440. By providing a telecentric lens 442 with a wide depth of field, the mobile robot 100 is able to precisely determine optical flow from tracking surfaces at a variety of depths from the mobile robot 100 without having to determine the distance to tracking surface.

In many applications, the mobile robot 100 relies primarily on the optical odometry sensor system 205 to capture odometry data, but the mobile robot may use odometry data captured by other types of odometry sensors when the acquired optical odometry data is below a certain threshold level of accuracy for reason including (but not limited to) noise, and/or lack of trackable features on the tracking surface. When the mobile robot 100 determines that the odometry data is below a minimum level of reliability (for example, based on a minimum SQUAL value and/or conflicting IMU values), the mobile robot may be optionally configured to rely upon odometry data captured by another sensor sampling at a high frequency, such as a wheel odometry sensor system. The wheel odometry sensor system may capture odometry data by analyzing the rotation of the wheels of the mobile robot 100. In another optional configuration, the mobile robot 100 may compare the odometry data provide by the optical odometry system and/or the wheel odometry sensor system against accelerometer and gyro data captured by an inertial measurement unit (IMU) to re-affirm the accuracy of the odometry data, for example confirming that the IMU senses the robot 100 is not moving when the mouse sensor sees no movement. By comparing odometry data captured by different types of sensor devices, the mobile robot 100 may increase (or decrease) a confidence level with respect to the accuracy of the optical odometry data based on the similarity of the data from the different devices. In implementations, the mobile robot 100 takes high frequency sensor readings to determine local position (for example, wheel odometry and IMU and/or optical odometry and IMU) and making a global determination of robot pose within an environment using more slowly sampled VSLAM localization data captured by an imaging sensor having a FOV aimed at a particular region of static landmarks.

By supplementing the high frequency odometry data with global sensor readings, the robot 100 determines an accurate pose within a global coordinate system and/or a persistent map of the environment and ignores, adjusts, and/or resets the high frequency local position data if there is a discrepancy in pose determination. Certain sensors may perform with better accuracy within certain environments while performing less accurately in others. For example, the optical odometry sensor system 205 provides accurate data when traveling over a floor surface that contains many trackable features, such as wood grain, but can lose accuracy when traveling over a smooth ceramic tile floor with few trackable features. Likewise, a wheel odometer can provide accurate readings on flooring surfaces, such as solid flooring, on which the drive wheels 220 have good traction and less accurate readings while traveling over a deep carpeted floor because the wheels may experience greater amounts of slipping as the robot 100 encounters frictional resistance forces and/or carpet drift as the nap of the carpet steers the wheels off of a straight heading.

In a number of implementations, the robot 100 includes an IMU, such as a 6 axis IMU combining a 3-axis accelerometer with a 3-axis gyrometer (hereafter referred to as "gyro"). By comparing the frequently sampled wheel odometry and mouse odometry data with IMU data, the robot 100 determines whether the wheel odometers and mouse sensors are properly reporting movement. For example, if a robot 100 is traveling over a smooth surface with too few features for the optical sensor to track and use to detect movement accurately, the mobile robot 100 will ignore the optical sensor data and default to one or more of other sensor readings to localize the robot 100 within the environment.

Mobile Robots with Optical Odometry Sensor Systems

As noted above, the mobile robot 100 incorporates an optical odometry sensor system 205 including an optical odometry camera 440 used to collect odometry data that can be used in the navigation of the mobile robot through an environment. The mobile robot 100 is illustrated in FIGS. 1-2. In particular, FIG. 1 illustrates a front perspective view of the mobile robot 100 and FIG. 2 illustrates a bottom view of the mobile robot 100 in which the recessed structure 210 containing the optical odometry sensor system 205 is visible.

In the mobile robot 100 configuration illustrated in FIG. 1, the mobile robot 100 includes a body 108 supported by a drive (located beneath the body 108 and thus not visible in this illustration) that can maneuver the robot 100 across a floor surface. In several embodiments, the mobile robot 100 is configured to actuate its drive based on a drive command. In some embodiments, the drive command may have x, y, and 0 components and the command may be issued by a controller circuit. The mobile robot body 108 may have a forward portion 105 corresponding to the front half of the body 108, and a rearward portion 110 corresponding the back half of the body 108. In the illustrated configuration, the drive system includes right and left driven wheel modules 220 that may provide odometry to the controller circuit. In the illustrated embodiment, the wheel modules 220 are substantially opposed along a transverse axis defined by the body 108 and include respective drive motors driving respective wheels. The drive motors may releasably connect to the body 108 (e.g., via fasteners or tool-less connections) with the drive motors optionally positioned substantially over the respective wheels. The wheel modules 220 can be releasably attached to the chassis and forced into engagement with the cleaning surface by springs. The mobile robot may include a caster wheel (not illustrated) disposed to support a portion of the mobile robot body 108, here, a forward portion of a round body 108. In other implementations having a cantilevered cleaning head, such as a square front or tombstone shaped robot body 108, the caster wheel is disposed in a reward portion of the robot body 108. The mobile robot body 108 supports a power source (e.g., a battery) for powering any electrical components of the mobile robot. Although specific drive mechanisms are described above with reference to FIG. 1, the mobile robot can utilize any of a variety of optional drive mechanisms as appropriate to the requirements of specific applications.

In many embodiments, a forward portion 105 of the body 108 carries a bumper 115, which can be utilized to detect (e.g., via one or more sensors) events including (but not limited to) obstacles in a drive path of the mobile robot. Depending upon the behavioral programming of the mobile robot, the controller circuit may respond to events (e.g., obstacles, cliffs, walls) detected by the bumper by controlling the wheel modules 220 to maneuver the robot 100 in response to the event (e.g., away from an obstacle).

As illustrated, a user interface 130 is disposed on a top portion of the body 108 and can be used to receive one or more user commands and/or display a status of the mobile robot 100. The user interface 130 is in communication with the robot controller circuit carried by the mobile robot 100 such that one or more commands received by the user interface can initiate execution of a cleaning routine by the mobile robot 100.

The mobile robot 100 may also include a machine vision system 120 embedded within the top cover of the mobile robot 100. The machine vision system 120 may include one or more cameras (e.g., standard cameras, volumetric point cloud imaging cameras, three-dimensional (3D) imaging cameras, cameras with depth map sensors, visible light cameras and/or infrared cameras) that capture images of the surrounding environment. In some embodiments, a camera 120 is positioned with its optical axis at an acute angle from the top surface of the robot 100 and the camera 120 has a field of view oriented in the direction motion of the mobile robot 100. In these embodiments, the lens of the camera is angled in an upwards direction such that it primarily captures images of the walls and ceilings surrounding the mobile robot in a typical indoor environment. For example, in implementations of a robot 100 having a top surface that is not more than 4 inches from the floor surface, a camera mounted under the top surface of the robot 100, having a field of view spanning a frustum of approximate 50 degrees in the vertical direction and an optical axis angled at approximately 30 degrees above horizontal will detect features in the environment at a height of generally 3-14 feet. For example, a robot of these dimensions with these camera settings will see objects at a height of approximately 6 inches to 4.5 feet at a distance of 3 feet, at a height of approximately 9 inches to 7.5 feet at a distance of 5 feet and at a height of approximately 1.2 feet to 14 feet at a distance of 10 feet. By focusing the camera 120 on an area in which features are unchanging, such as those features imaged around door frames, picture frames and other static furniture and objects, the robot 100 can identify reliable landmarks repeatedly, thereby accurately localizing and mapping within an environment.

The images captured by the machine vision system 120 may be used by VSLAM processes in order to make intelligent decisions about actions to take based on the mobile robot's operating environment. While the machine vision system 120 is described herein as being embedded on top of the mobile robot, cameras 120 can additionally or alternatively be arranged at any of various different positions on the mobile robot, including on the front bumper, bottom surface, and/or at locations along the peripheral sides of the mobile robot.

In addition to the machine vision system 120, the mobile robot 100 may optionally include a variety of sensor systems in order to achieve reliable and robust autonomous movement. The additional sensor systems may be used in conjunction with one another to create a perception of the mobile robot's environment sufficient to allow the mobile robot 100 to make intelligent decisions about actions to take in that environment. As noted above, one of the sensor systems included on the mobile robot is an optical odometry sensor system 205 that captures odometry data. In some embodiments, the optical odometry sensor includes one or more optical odometry cameras 440 positioned under the mobile robot body 108 to capture images of a tracking surface over which the mobile robot travels. Each optical odometry sensor system 205 includes a camera that is positioned such that it is pointed directly at the tracking surface under the mobile robot.

In the illustrated configuration, the optical odometry camera 440 is positioned within a recessed structure 210 at a height of approximately 40-60 mm (e.g. 45 mm, 50 mm, 60 mm) from the tracking surface. The optical odometry camera 440 includes a telecentric lens configured to capture images at a range of distances from the camera spanning a focal length of approximately negative 5 to positive 15 mm, or approximately 20 mm total. The depth of field of the optical odometry camera 440 is proportional to the focal length. Using in-focus and acceptably blurry images captured of the tracking surface by the camera, the optical odometry sensor system 205 can compute a distance traveled by the mobile robot 100 by analyzing the optical flow of the images based on the time at which the images were captured. The odometry data may be used in any of a variety of navigation processes including (but not limited to) a VSLAM process.

The mobile robot 100 may also capture movement information using various other types of sensors, including wheel odometry sensors, gyroscopes, accelerometers, global positioning systems (GPS), compasses, among other sensors capable of providing information regarding the movement of the mobile robot within the environment. The movement information provided by different movement sensors may include new types of information (e.g., a direction of movement, orientation, acceleration, GPS coordinates, etc. of the mobile robot) and/or the same types of information captured through different mechanisms (e.g., wheel and optical odometers may both provide information regarding a distance traveled).

Furthermore, the various sensor systems may also include one or more types of sensors supported by the robot body 108 including, but not limited to, obstacle detection obstacle avoidance (ODOA) sensors, communication sensors, navigation sensors, range finding sensors, proximity sensors, contact sensors, sonar, radar, LIDAR (Light Detection And Ranging, which can entail optical remote sensing that measures properties of scattered light to find range and/or other information of a distant target), and/or LADAR (Laser Detection and Ranging). In some optional configurations of the mobile robot, the sensor system includes ranging sonar sensors, proximity cliff detectors, contact sensors, a laser scanner, and/or an imaging sonar.

There are several challenges involved in placing sensors on a robotics platform. First, the sensors are typically placed such that they have maximum coverage of areas of interest around the mobile robot. Second, the sensors are typically placed in such a way that the robot itself causes an absolute minimum of occlusion to the sensors; in essence, the sensors should not be placed such that they are blinded by the robot itself. Accordingly, the sensors should be mounted in a manner so as not to interfere with normal robot operation (e.g., snagging on obstacles). With specific regard to the placement of the optical odometry sensor system, the mobile robot 100 can be configured so that the optical odometry sensor system 205 is located within a recessed structure 210 formed within the underside of the mobile robot body 108. By using the recessed structure, the optical odometry camera 440 is able to (1) capture images of the surface under the mobile robot, (2) avoid contact with objects that may damage the camera, and (3) have an optical system capable of capturing in-focus images at a variety of different distances.

Figure 2B:
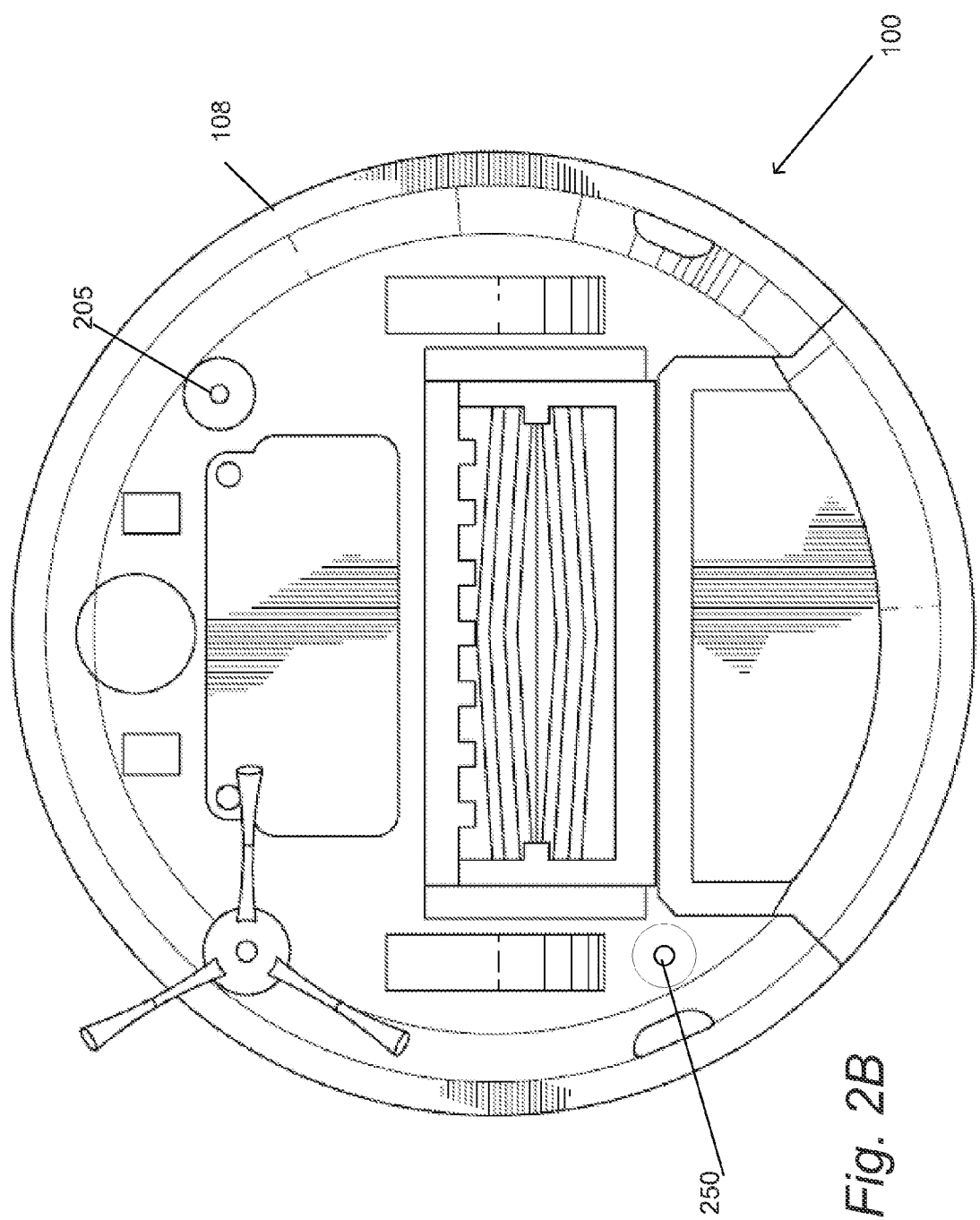
FIG. 2B is a bottom view of a mobile robot incorporating a plurality of optical odometry cameras.

Placement of one or more optical odometry sensor systems with respect to the underside of the mobile robot 100 in accordance with embodiments of the invention is illustrated in FIGS. 2A-2B. FIG. 2A illustrates the recessed structure 210 containing the optical odometry sensor system 205 positioned in the front right region of the underside of the rounded mobile robot body 108. FIG. 2A also illustrates various other components that may be optionally included on the mobile robot 100, including the right and left wheel modules 220, side brush 230, and cleaning assembly 240.

FIG. 2B illustrates two optical odometry sensor systems 205, 250 located on opposite sides of the underside of the mobile robot 100. Configuring the mobile robot 100 with two or more optical odometry sensor systems can increase the accuracy of the odometry data. Using two optical odometry sensor systems 205, 250 permits cross checking of the odometry data being generated by each individual optical odometry sensor system. Furthermore, if one of the optical odometry sensor system 205, 250 is not functioning properly, the mobile robot 100 may rely on the other optical odometry sensor 205, 250 system to collect odometry data.

Figure 3:
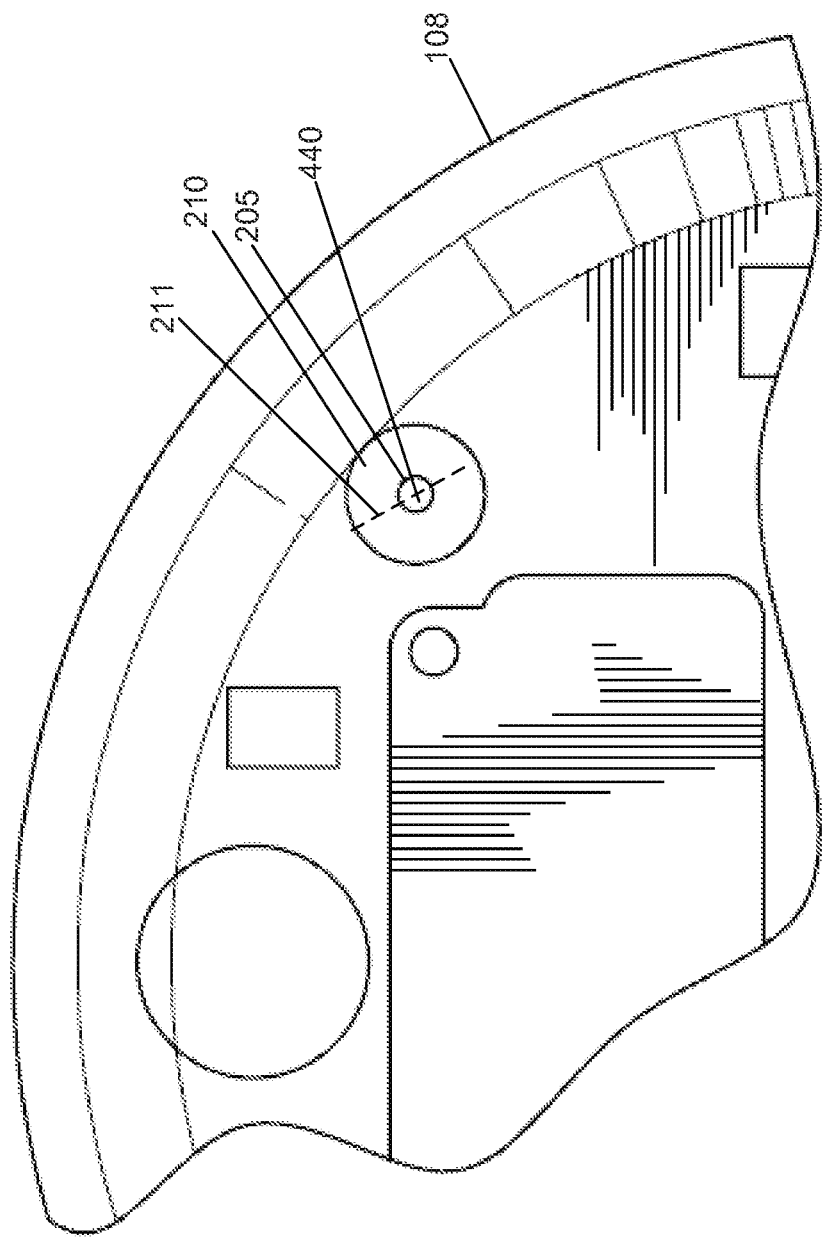
FIG. 3 is a view of the portion of the body of the mobile robot incorporating a recessed structure containing an optical odometry camera.

FIG. 3 illustrates the recessed structure 210 containing the optical odometry sensor system in more detail. As illustrated, the optical odometry camera 440 is positioned within a rounded recessed structure 210 in the underside of the mobile robot body. The recessed structure 210 can have a diameter 211 large enough to enable a human finger to fit therein for the removal of foreign objects or debris (FOD). In some implementations, the diameter of the recessed structure 210 is between 0.5 and 1.5 inch (e.g. 0.5 to 1 inch, 0.75 to 1.5 inch, 0.5 to 0.75 inch, 0.75 to 1 inch). The optical axis of the optical odometry camera 440 is directed outwards so that the camera can capture images of a tracking surface while the mobile robot 100 moves along the surface.

Optical Odometry Sensor System Structure

As described above, optical odometry sensor systems can include an optical odometry camera 440 that captures images of a surface and uses the images to compute odometry data. The optical odometry camera 440 may run at a frame rate of over one thousand frames per second, capturing an image of a tiny patch of the tracking surface. In implementations, such as that illustrated in FIG. 13D, the image patch 1330 is approximately 1 mm by 1 mm (e.g. 0.5 mm by 0.5 mm, 0.5 mm by 0.75 mm, 0.5 mm by 1 mm, 0.75 mm by 1 mm, 1.5 mm by 1.5 mm). The optical odometry sensor system 205 continuously compares displacement of trackable features in each image captured by the optical odometry camera 440 to the one before it, using optical flow to estimate the relative motion of the mobile robot. In order for the optical odometry camera 440 to capture in-focus images for use in determining optical flow, the tracking surface must be located a distance from the camera that remains within an acceptable focal range within the depth of field of the optical axis of the optical odometry camera 440. For example, an acceptable focal range is one that includes carpet extending into the recessed structure 210 and tile having peaks and valleys, such as slate. In implementations, the image patch 1330 is 22 pixels by 22 pixels and the acceptable depth of field of the optical odometry camera 440 is determined by blurring an image patch 1330 until one pixel bleeds into an adjacent pixel. An acceptable amount of blur may be, for example, a depth of field that blurs pixels without bleeding between pixels in the image patch 1330 or bleeding of up to two adjacent pixels within the image patch 1330.

In one optional configuration, the optical odometry camera 440 is configured with a comparatively wide depth of field such that it is able to capture in-focus and/or acceptably blurry images of tracking surfaces positioned at various distances from the optical odometry camera 440. In another optional configuration, the mobile robot may use a recessed structure under the mobile robot body 108 to allow for the use of an optical odometry camera 440 having a wide depth of field. An example of a recessed structure 210 that can be used to house a recessed optical odometry system is illustrated in FIG. 4.

Figure 4:
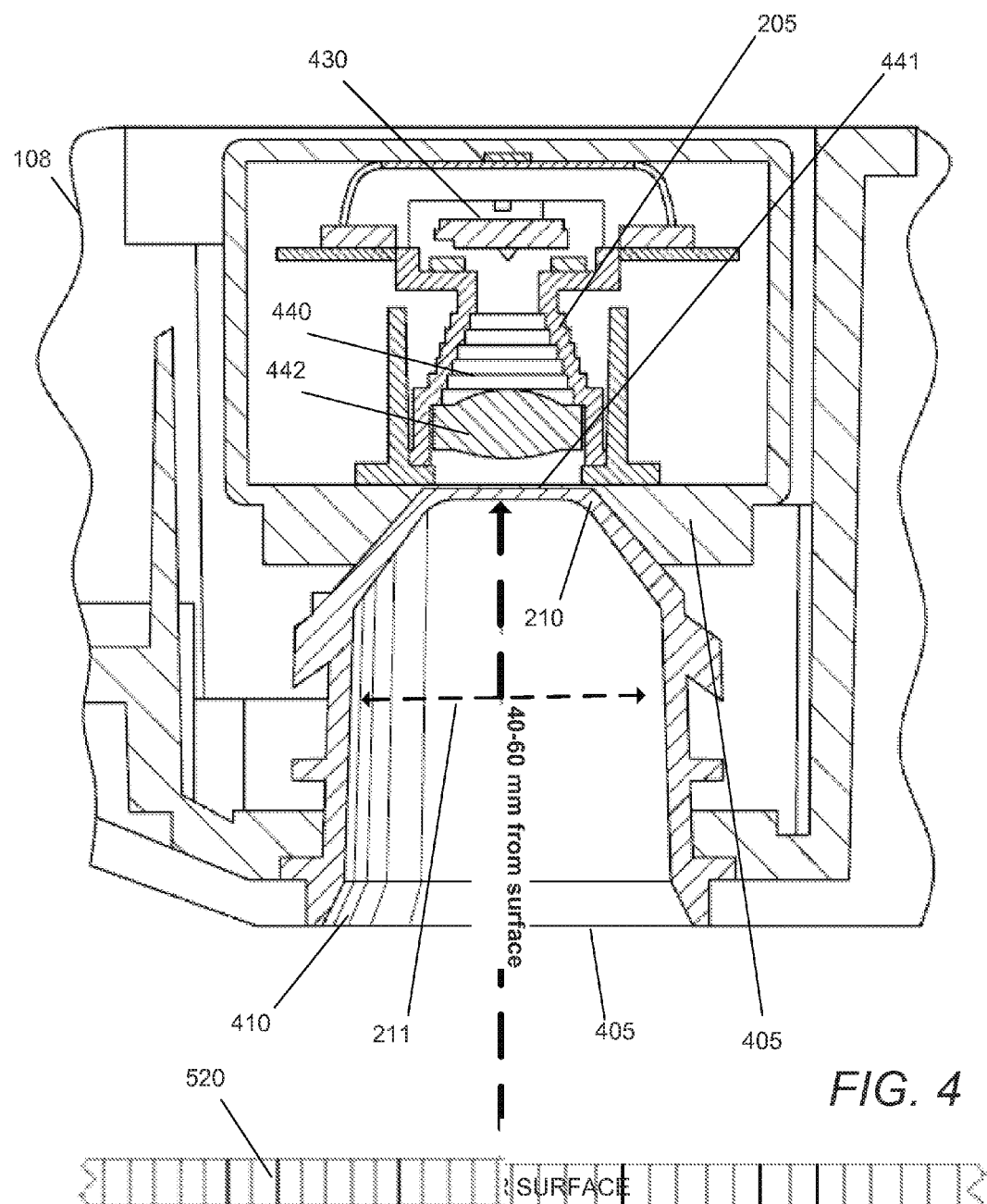
FIG. 4 is a cross-sectional view of the recessed structure containing the optical odometry camera.

FIG. 4 conceptually illustrates a cross-sectional view of an optional configuration of the mobile robot 100 in which an optical odometry camera 440 is mounted within a recessed structure 210 within the mobile robot body 108. As illustrated, the optical odometry camera 440 is contained within a recessed structure under the mobile robot body 108. The recessed structure 210 includes an opening 410. The sensor 430 and optics 440 of the optical odometry camera 440 are located within the recessed structure 210 to capture images through the opening 410 in the recessed structure. The recessed structure 210 can be optionally configured to form a chamber between the optics of the camera 440 and the opening 410. As discussed further below, certain surfaces such as (but not limited to) carpet may intrude into the chamber. As is discussed below, the mobile robot 100 can be optionally configured with an optical odometry camera 440 that has a depth of field extending over a range of distances including distances that are within the recessed structure 210 and distances that are beyond the opening 410 of the recessed structure 210. All surfaces of the recessed structure 210 are out of focus so that the camera 440 does image any dust collected on those surfaces to the sensor 430. In one optional configuration, the recessed structure 210 has a diameter 211 large enough to enable a human finger to fit therein for the removal of foreign objects or debris (FOD). In some implementations, the diameter 211 of the recessed structure 210 is between 0.5 and 1.5 inch or approximately 10 mm to 40 mm (e.g. 0.5 to 1 inch, 0.75 to 1.5 inch, 0.5 to 0.75 inch, 0.75 to 1 inch).

Many embodiments of the mobile robot 100 use the recessed structure to place the optical odometry camera 440 significantly above the tracking surface in order to eliminate the potential of having objects damage the camera, including a lens cover 441 of the camera 440, while the mobile robot 100 travels through an environment. As can be readily appreciated, locating the optical odometry camera 440 at a height that is likely to avoid contact with the tracking surface and/or objects located on the tracking surface can significantly reduce the likelihood of damage to the optical odometry camera 440.

Furthermore, in implementations, the opening 410 of the recessed structure 210 aligns with the bottom surface of the robot 100 and is approximately 10 mm from the floor surface beneath the robot 100. The recessed structure 210 accommodates an optical odometry camera 440 having a focal length of approximately 15-25 mm, (e.g., 17 mm, 18 mm, 19 mm, 20 mm), a pinhole aperture and a depth of field of 40-60 mm (e.g., 45 mm, 50 mm, 55 mm) In implementations, the optical odometry camera 440, therefore, is configured to collect odometry data from surfaces positioned at various different distances beneath the mobile robot within the acceptable focal range of, for example, negative 5 mm to 15 mm, for a total range of 20 mm. In examples, the optical odometry camera 440 is positioned within the recessed structure at a distance of approximately 40-60 mm (e.g. 45 mm, 50 m, 55 mm) from the bottom of the robot in order to obtain the necessary depth of field for a focal range of negative 5 mm to 15 mm. In particular, the camera configuration provides a depth of field that captures in-focus images of hard floor surfaces (e.g., hardwood floors) and closer floor surfaces (e.g., plush carpet), which are likely to vary in distance from the camera by approximately 20-25 mm.

In some implementations, the optical odometry camera 440 uses a telecentric lens 442 that allows the optical odometry sensor system 205 to determine the precise size of objects independently from their depth within the field of view of the camera 440. Telecentric lenses have a constant magnification of objects independent of their distance. By utilizing an optical odometry camera 440 with constant magnification, the optical odometry sensor system 205 can determine the magnitude of movement from optical flow without having to determine the distance to the tracking surface in order to scale the magnitude of the optical flow.

Optical odometry sensor systems may use an LED or laser to illuminate the tracking surface being imaged by the optical odometry camera 440. By positioning the optical odometry camera 440 within a recessed structure, many embodiments are also able to specify an LED design that provides uniform illumination of the tracking surface. Various optional LED configurations that can be utilized to illuminate tracking surfaces are discussed below below.

Optical Odometry Sensor Systems Incorporating Multiple LEDs

Many optical odometry sensor systems use a single LED to illuminate the tracking surface. However, by using only one LED, the illumination of the surface is often not uniform, but rather is likely to contain shadows based on the contour of the surface being illuminated. For example, if a carpet is being illuminated by one LED, then a shadow may be visible based on the position of the LED with respect to a particular strand of carpet being illuminated. Images that are more uniformly illuminated can provide more precise odometry data.

Figure 5:
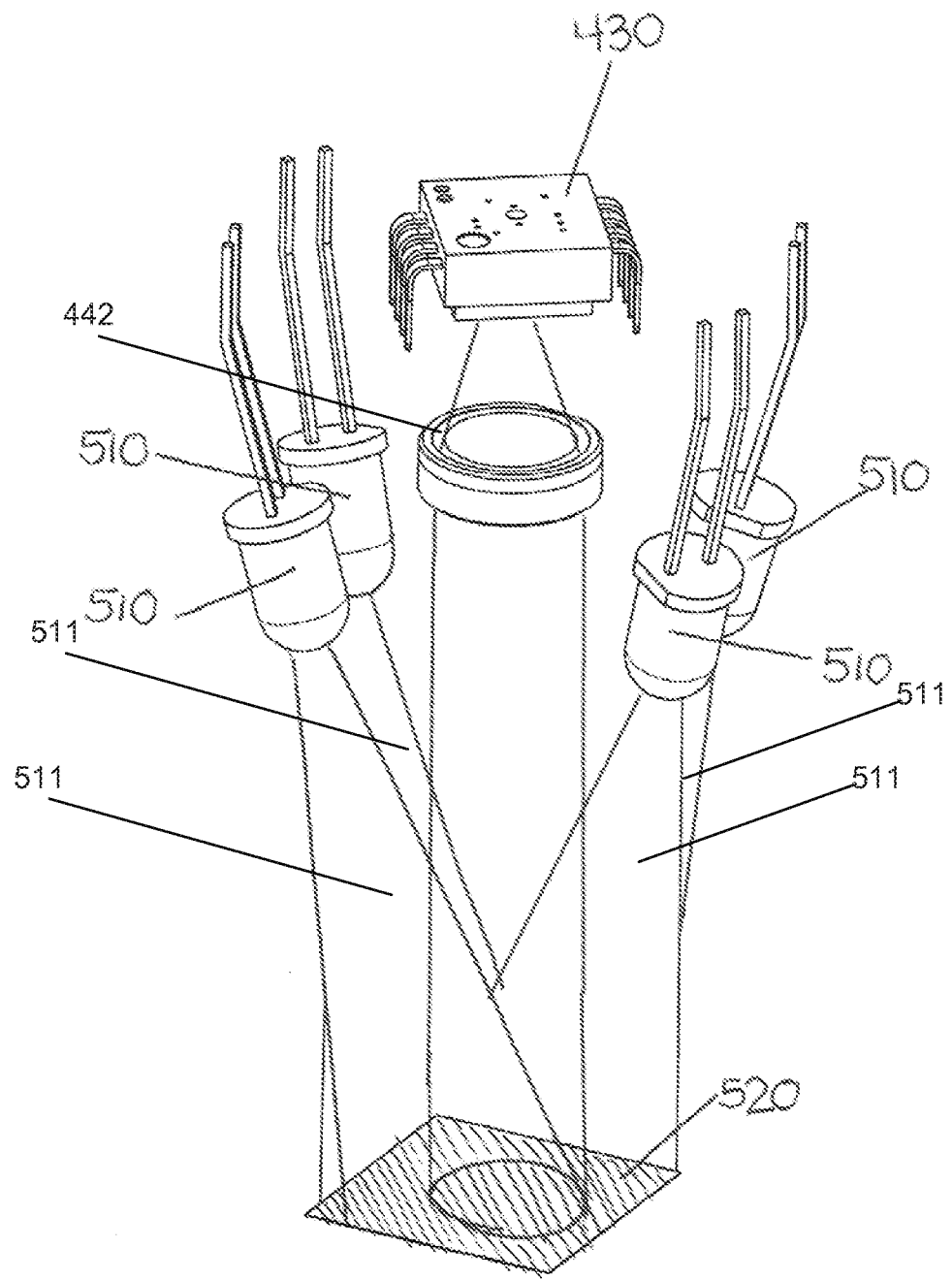
FIG. 5 conceptually illustrates LED placement with respect to the optical odometry camera.

Turning to FIGS. 4 and 5, in order to provide uniform illumination of the tracking surface, in implementations, the optical odometry sensor system 205 includes an optical odometry camera 440 surrounded by at least two LEDs positioned around the camera lens 442. An example of an optical odometry camera 440 with four LEDs positioned surrounding the camera lens 442 is illustrated in FIG. 5. In particular, FIG. 5 illustrates an optical odometry camera 440 that includes four LEDs 510 positioned around the optical odometry camera lens 442 of the system. By using four LEDs 510, images of the surface 520 may be captured with a more uniform amount of light that reduces the shadows that may be visible in the captured images. Additionally, by overlapping some or all of the emissions of four small LEDs 510, the configuration of FIGS. 4 and 5 provide sufficient combined illumination to image the floor. Furthermore, more of the textures and trackable features of the surface may now become visible within the captured images for use in determining optical flow. In many embodiments, each LED 510 is angled to increase the uniformity of the illumination of the tracking surface. In some embodiments, each LED 510 is angled at approximately 10-20 degrees (e.g. 12 degrees, 15 degrees, 17 degrees) from vertical to provide the optimal illumination (e.g., illumination of trackable features on the floor surface 520 without shadowing) of the surface based on the recess structure 410 holding the camera. In some implementations, the emission cones 511 of the LEDs overlap on a surface for a combined illumination and in other implementations, the emission cones do not converge.

Figure 13A:
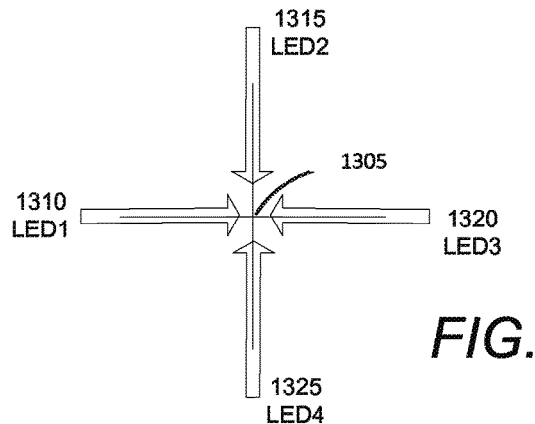
FIGS. 13A-13D are schematics illustrating implementations of LED configurations around a telecentric lens.
Figure 13B:
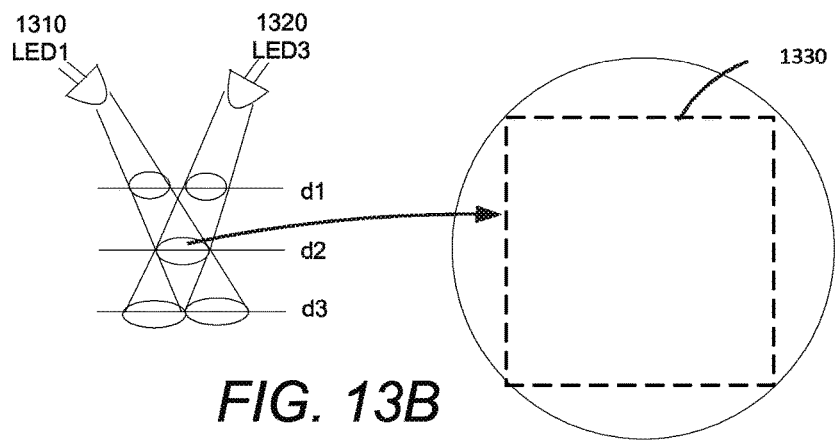
Figure 13C:
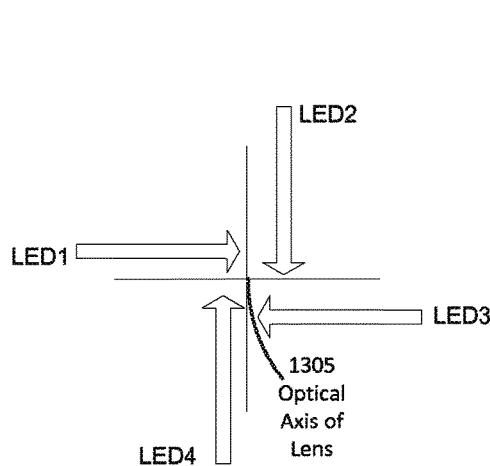
Figure 13D:
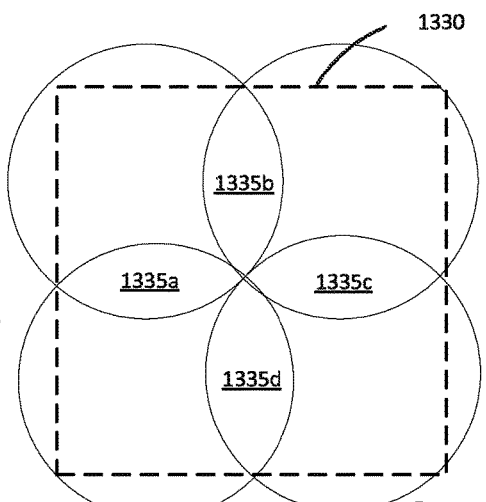

As FIGS. 13A-13B illustrate, in one example, four LEDS 1310, 1315, 1320, 1325 are angled so that their emissions converge on the optical axis 1305 of a telecentric lens of the optical odometry camera 440 at a middle distance d2 in the field of view. At this middle distance d2, the illumination from all four LEDS 1310, 1315, 1320, 1325 overlap in a circle and the usable image patch 1330 is limited to an area within the convergent circles because brightness falls off at the outer edges of the illuminated circle, which may make only a portion of the illuminated area useful for tracking. In the implementation of FIGS. 13C and 13D, the four LEDS 1310, 1315, 1320, 1325 are each aimed so that their emissions are offset from the optical axis 1305 of the telecentric optical odometry camera lens 442. The emissions from the four LEDS 1310, 1315, 1320, 1325 therefore do not converge at a single circle. Instead, as indicated in FIG. 13D, each of the emissions overlaps with two other emissions at an overlap patch 1335a-1335d such that the trackable area illuminated by the four LEDS 1310, 1315, 1320, 1325 is greater than in a fully convergent implementation. This spiral illumination pattern provides for fewer areas of brightness drop off and a larger illuminated coverage area for detecting trackable features within the image patch. More critically, the spiral illumination pattern of FIGS. 13C-D provides even illumination of the surface below the camera 400 without any bright spots that would flood the camera and wash out the remaining portion of the imaged area. The spiral pattern of FIGS. 13C-D therefore provides less illumination than all four light emissions overlapping in one location. By overlapping no more than two light emissions from two LEDs in any one area the illumination on the surface below the camera 440 is maintained at light intensity below a threshold level of brightness that would dominate the image and wash out otherwise perceptible details around the intensely bright spot.

Optical Odometry Sensor System for Use with Different Surfaces

Figure 6:
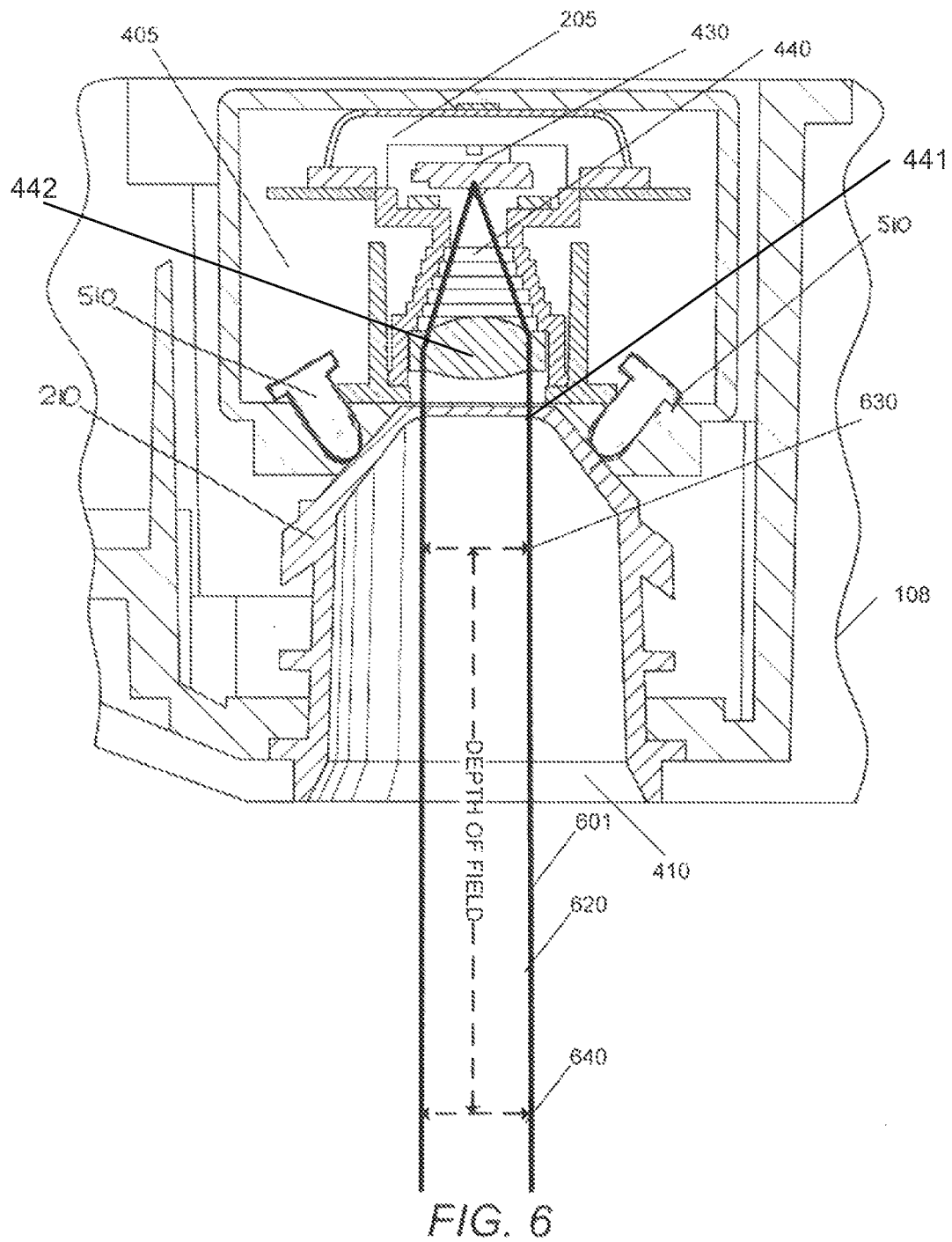
FIG. 6 is a cross-sectional view of the recessed structure containing the optical odometry camera illustrating the depth of field of the optical odometry camera.
Figure 7:
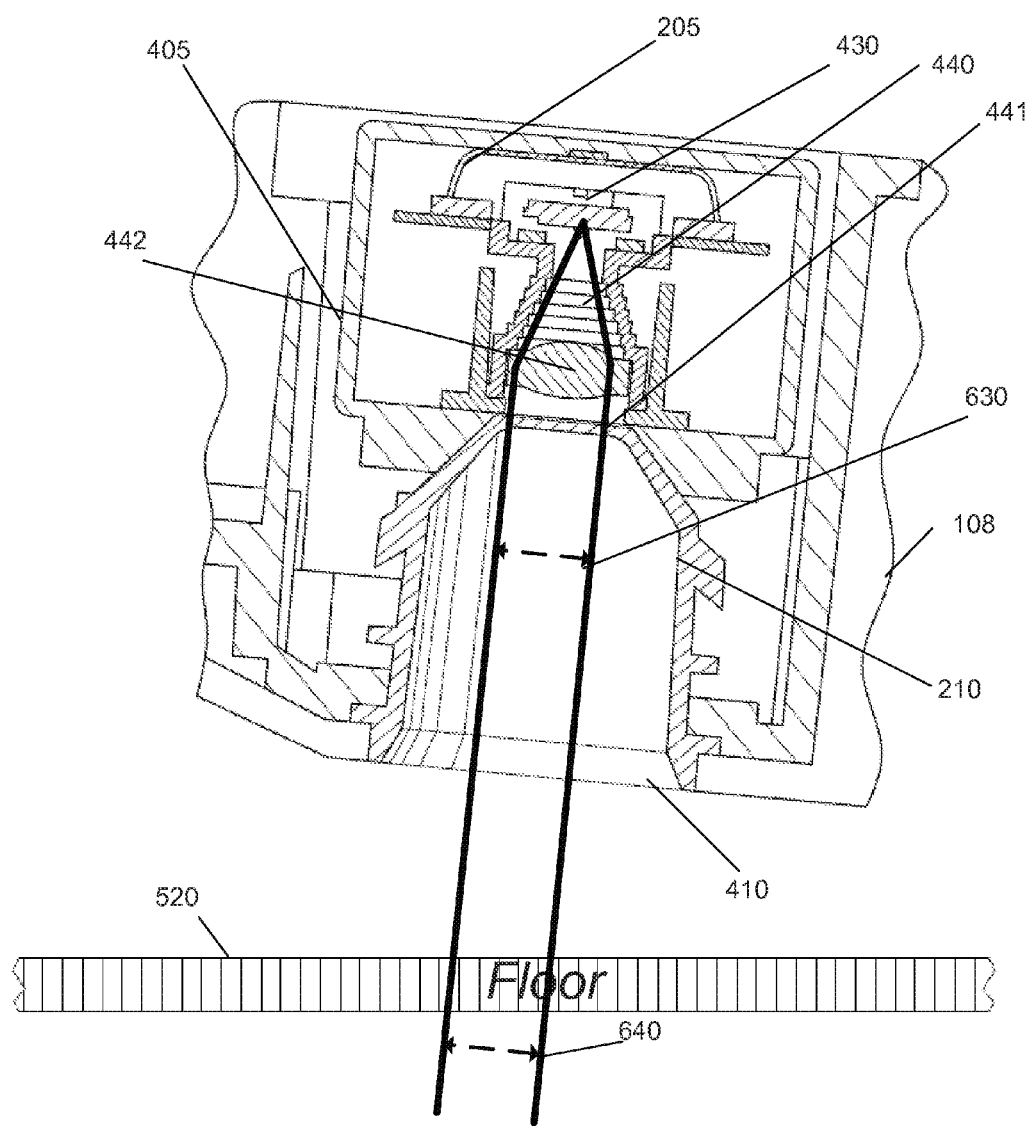
FIG. 7 is a cross-sectional view of the recessed structure containing the optical odometry camera illustrating the depth of field of the optical odometry camera in relation to a flat surface at a particular height when the mobile robot is tilted.
Figure 8:
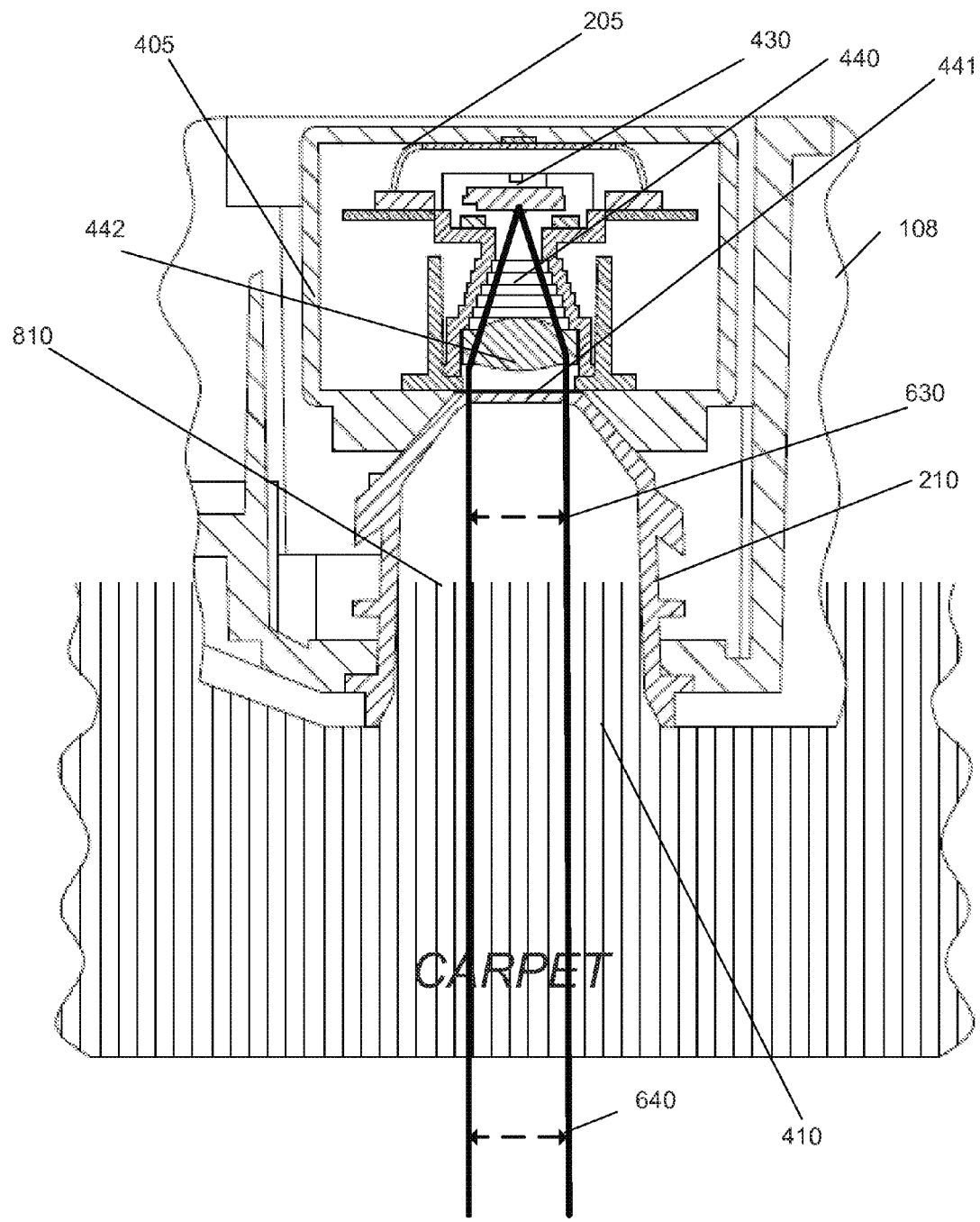
FIG. 8 is a cross-sectional view of the recessed structure containing the optical odometry camera illustrating the depth of field of the optical odometry camera in relation to a carpeted surface, where the carpet pile intrudes within the recessed structure.

An optical odometry camera 440 that can capture images that are in focus over a range of distances can be particularly useful when the mobile robot travels across different types of surfaces that may be at different distances beneath the underside of the mobile robot. FIGS. 6-8 conceptually illustrate the manner in which an optical odometry camera 440 having a wide depth of field can capture precise optical odometry data in a range of real world conditions that are particularly likely to be encountered when the mobile robot 100 is configured as a housecleaning robot riding at approximately 10 mm above a floor surface.

FIG. 6 conceptually illustrates the depth of field 601 of the optical odometry camera 440 illustrated in FIG. 4 using light rays 620. The depth of field 601 extends from a first distance 630 within the chamber formed by the recessed structure 210 in front of the optical odometry camera 440 having a telecentric lens 442 to a second distance 640 beyond the opening 410 of the recessed structure 210. Thus a surface positioned within this range will generally be captured in-focus by the optical odometry camera 440 and thus may be used to ascertain optical odometry data. Examples of different types of surfaces located at different distances from the optical odometry system are conceptually illustrated in FIG. 7 and FIG. 8.

FIG. 7 conceptually illustrates the mobile robot 100 traveling across hard surface, such as hardwood floor or tile floor. Furthermore, the mobile robot 100 is tilted relative to the floor. The mobile robot 100 may tilt for any of a variety of reasons including (but not limited to) traveling over an object, when the floor is uneven, and/or traversing a transition between floor surfaces at different heights. Even with the increase in the distance between the mobile robot and the tracking surface that results when the mobile robot 100 is tilted, the depth of field 601 of the optical odometry camera 440 is sufficiently large so as to continue to capture in-focus images and/or acceptably out of focus images of the portion of the tracking surface visible through the opening 410 in the recessed structure 210 containing the optical odometry sensor system.

FIG. 8 conceptually illustrates the mobile robot 100 traveling over a carpeted surface. Carpet fibers 810 are intruding through the opening 410 into the recessed structure 210 as would occur if the height of the carpet exceeds the distance between the underside of the mobile robot and the bottom of the wheels. Even with the decrease in the distance between the optical odometry camera 440 and the tracking surface, the depth of field 601 of the optical odometry camera 440 is sufficiently large so as to enable the capture of in focus and acceptably blurry images of the carpet. Thus, by using the particular optical odometry camera 440 configuration, the optical odometry sensor system 205 is able to capture odometry data for a variety of different types of surfaces that may be located at different distances under the mobile robot. The conceptual operation of mobile robots configured by robot controllers in accordance with various embodiments of the invention are discussed further below.

Mobile Robot Behavioral Control Systems

The mobile robot 100 can optionally be configured using behavioral control applications that determine the mobile robot's behavior based upon the surrounding environment and/or the state of the mobile robot 100. In one optional configuration, the mobile robot can include one or more behaviors that are activated by specific sensor inputs and an arbitrator determines which behaviors should be activated. In another optional configuration, sensor inputs can include images of the environment surrounding the mobile robot 100 and behaviors can be activated in response to characteristics of the environment ascertained from one or more captured images.

Figure 9:
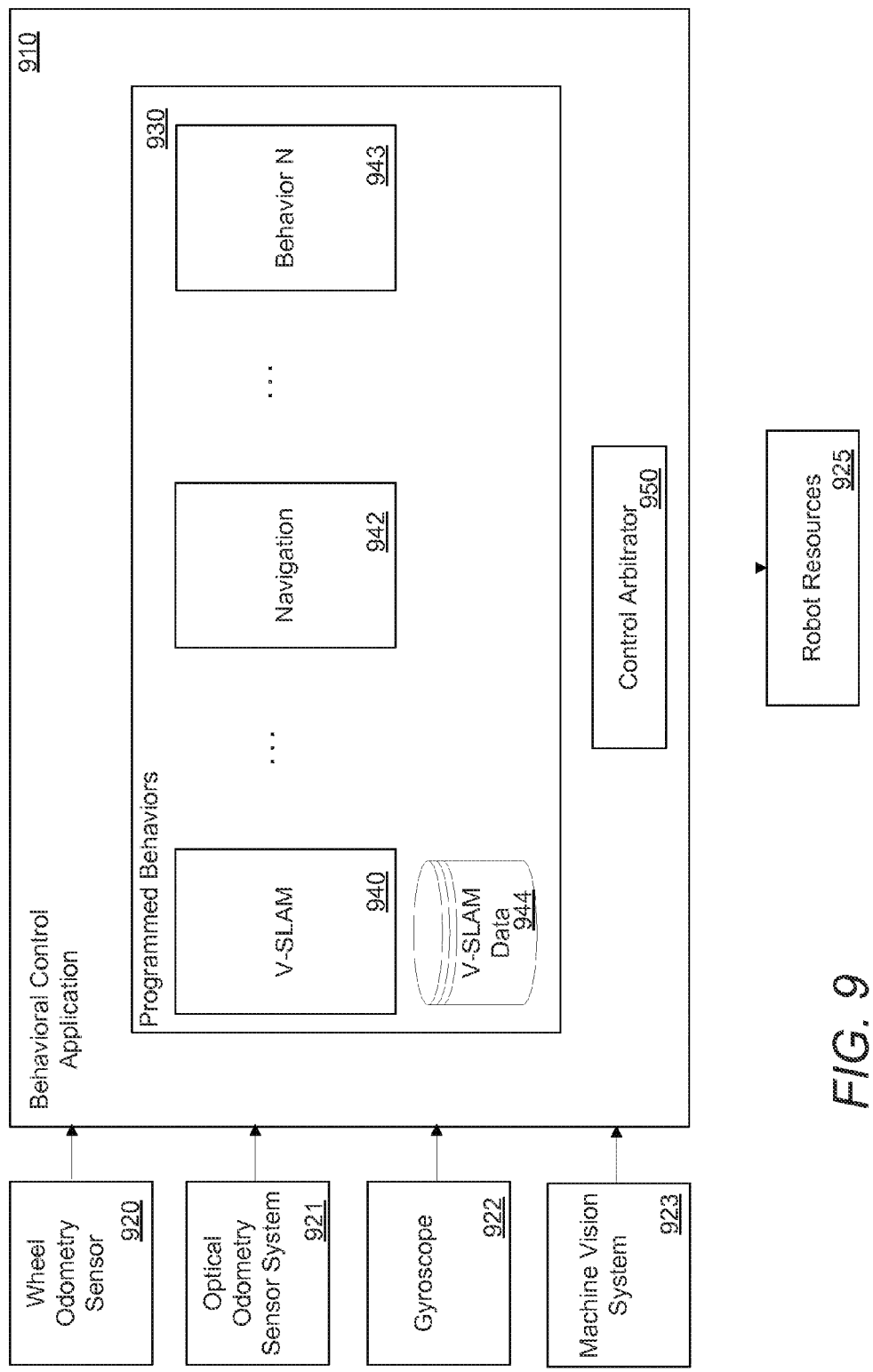
FIG. 9 conceptually illustrates the execution of a behavioral control application by a robot controller.

An optional configuration of the mobile robot 100 in which behavioral control applications enable navigation within an environment based upon (but not limited to) VSLAM processes is conceptually illustrated in FIG. 9. The mobile robot 100 behavioral control application 910 can receive information regarding its surrounding environment from one or more sensors, including a wheel odometry sensor 920, optical odometry sensor system 921, gyroscope 922, and a machine vision system 923. Although not illustrated, one or more other sensors (e.g., bump, proximity, wall, stasis, and/or cliff sensors) may be carried by the mobile robot 100. The wheel odometry sensor 920 captures odometry data based on the rotation of the wheels of the mobile 100. The accuracy of this odometry data may vary based on the particular type of surface over which the mobile robot 100 traverses. For example, in a deep carpeted surface, the wheels may slip diminishing the accuracy of the odometry data.

As discussed in detail above, the optical odometry sensor system 921 gathers odometry data using images captured by a camera 440 as the mobile robot 100 traverses across a surface of an environment. The odometry data captured by the optical odometry camera 440 may include information regarding a translational distance and direction travelled by the mobile robot 100. In some configurations, however, this odometry data may not include information regarding a direction of motion of the mobile robot 100. Direction of motion information may be gathered from several different types of sensors, including a gyroscope, compass, accelerometer among various other sensors capable of providing this information.

The gyroscope sensor 922 captures orientation data of the mobile robot 100 as it travels through the environment. The data captured from the various sensors 920-923 may be combined in order to ascertain various information regarding the movement and pose of the mobile robot 100.

The mobile robot behavioral control application 910 can control the utilization of robot resources 925 (e.g., the wheels modules 220) in response to information received from the sensors 960, causing the mobile robot 100 to actuate behaviors, which may be based on the surrounding environment. The programmed behaviors 930 may include various modules that may be used to actuate different behaviors of the mobile robot 100. In particular, the programmed behaviors 730 may include a VSLAM module 940 and corresponding VSLAM database 944, a navigation module 942, and a number of additional behavior modules 943. The mobile robot behavioral control application 910 can be implemented using one or more processors in communication with memory containing non-transitory machine readable instructions that configure the processor(s) to implement a programmed behaviors system 930 and a control arbitrator 950.

In the illustrated configuration, the VSLAM module 940 manages the mapping of the environment in which the mobile robot 100 operates and the localization of the mobile robot with respect to the mapping. The VSLAM module 940 can store data regarding the mapping of the environment in the VSLAM database 944. The data may include a map of the environment and characteristics of different regions of the map including, for example, regions that contain obstacles, other regions that contain traversable floor, regions that have been traversed, regions that have not yet been traversed, the date and time of the information describing a specific region, and/or additional information that may be appropriate to the requirements of a specific application. In many instances, the VSLAM database also includes information regarding the boundaries of the environment, including the location of stairs, walls, and/or doors. As can readily be appreciated, many other types of data may be stored and utilized by the VSLAM module 940 in order to map the operating environment of a mobile robot 100 as appropriate to the requirements of specific applications in accordance with embodiments of the invention.

In several embodiments, the navigation module 942 actuates the manner in which the mobile robot 100 is to navigate through an environment based on the characteristics of the environment. The navigation module 942 may direct the mobile robot 100 to change directions, drive at a certain speed, drive in a certain manner (e.g., wiggling manner to scrub floors, a pushing against a wall manner to clean sidewalls, etc.), navigate to a home charging station, and various other behaviors.

Other behaviors 943 may also be specified for controlling the behavior of the mobile robot. Furthermore, to make behaviors 940-943 more powerful, it is possible to chain the output of multiple behaviors together into the input of another behavior module to provide complex combination functions. The behaviors 940-943 are intended to implement manageable portions of the total cognizance of the mobile robot and, as can be readily appreciated, mobile robots can incorporate any of a variety of behaviors appropriate to the requirements of specific applications.

Referring again to FIG. 9, the control arbitrator 950 facilitates allowing modules 940-943 of the programmed behaviors 930 to each control the mobile robot 100 without needing to know about any other behaviors. In other words, the control arbitrator 950 provides a simple prioritized control mechanism between the programmed behaviors 930 and resources 925 of the mobile robot 100. The control arbitrator 950 may access behaviors 940-943 of the programmed behaviors 930 and control access to the robot resources 960 among the behaviors 940-943 at run-time. The control arbitrator 950 determines which module 940-943 has control of the robot resources 960 as required by that module (e.g. a priority hierarchy among the modules). Behaviors 940-943 can start and stop dynamically and run completely independently of each other. The programmed behaviors 930 also allow for complex behaviors that can be combined together to assist each other.

The robot resources 960 may be a network of functional modules (e.g., actuators, drive systems, and groups thereof) with one or more hardware controllers. The commands of the control arbiter 950 are typically specific to the resource to carry out a given action. The conceptual operation of the mobile robot when configured by a robot controller circuit is discussed further below.

Robot Controller Circuit

The behavior of the mobile robot 100 when configured by a robot controller circuit is typically selected from a number of behaviors based upon the characteristics of the mobile robot's surrounding operating environment and/or the state of the mobile robot 100. In many embodiments, characteristics of the environment may be ascertained from images captured by a machine vision sensor system and movement through the environment can be tracked using images captured by an optical odometry camera 440. Captured images can be used by one or more VSLAM processes to map the environment surrounding the mobile robot 100 and localize the position of the mobile robot 100 within the environment.

Figure 10:
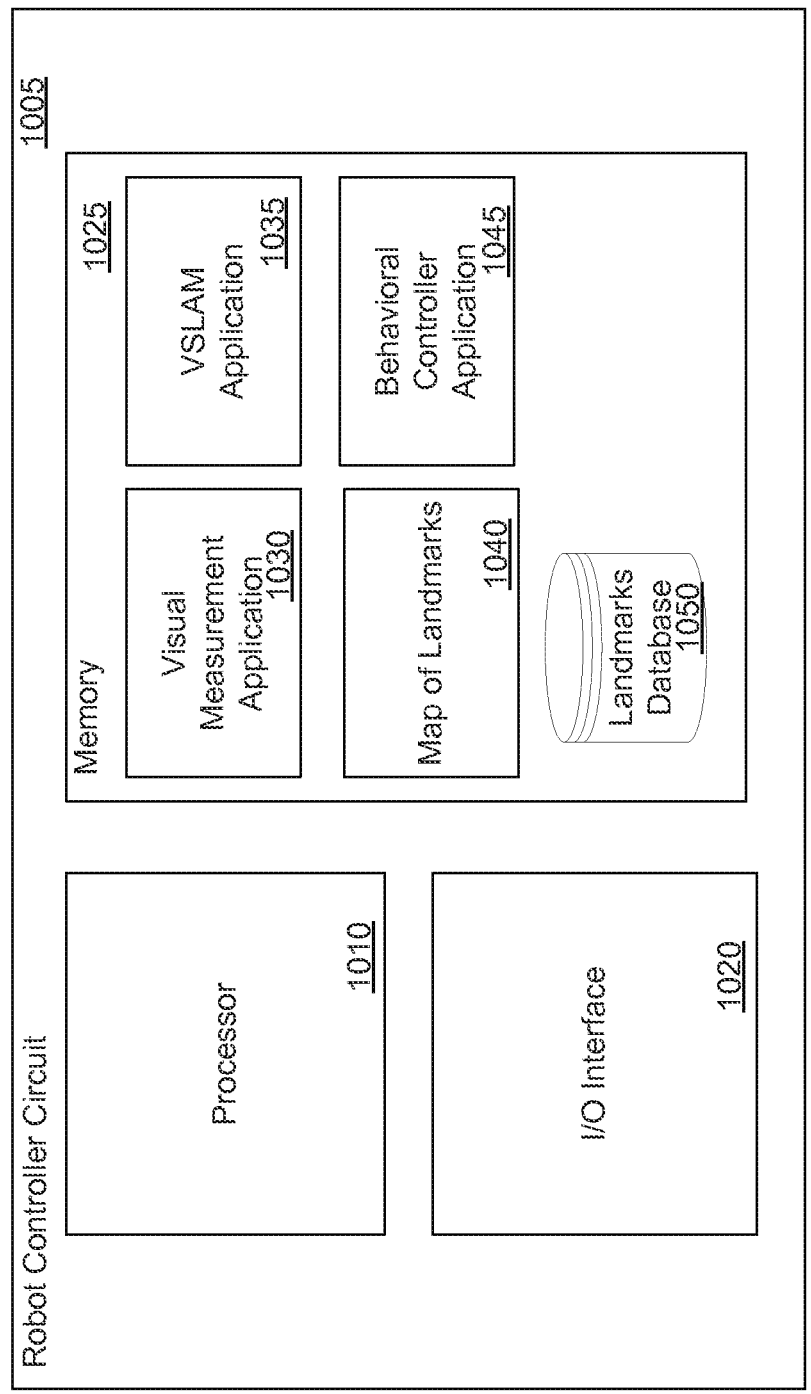
FIG. 10 conceptually illustrates a robot controller.

A mobile robot controller circuit that can be used to perform VSLAM using a machine vision system and an optical odometry sensor system is illustrated in FIG. 10. The robot controller circuit 1005 includes a processor 1010 in communication with a memory 1025 and an input/output interface 1020. The processor 1010 can be a single microprocessor, multiple microprocessors, a many-core processor, a microcontroller, and/or any other general purpose computing system that can be configured by software and/or firmware. The memory 1025 contains a visual measurement application 1030, a VSLAM application 1035, a map of landmarks 1040, a behavior control application 1045 and a landmarks database 1050.

The visual measurement application 1030 identifies features within a set of input images and identifies a landmark from the landmark database 1050 based upon the similarity of the collection of features identified in the input images to a matching the collection of features associated with the identified landmark from the landmarks database 1050. The visual measurement application can also generate new landmarks by identifying a set of features within a series of captured images, analyzing the disparity information of the set of features to determine the 3D structure of the features, and storing the 3D features as a new landmark within the landmarks database 1050.

The VSLAM application 1035 estimates the location of the mobile robot 100 within a map of landmarks based upon a previous location estimate, odometry data, and at least one visual measurement received from the visual measurement application. As noted above, the images may be utilized by a VSLAM application 1035. In certain embodiments, features are extracted from a newly acquired image and the features are compared to features previously detected and saved within the landmarks database 1050. The VSLAM application 1035 updates the map of landmarks based upon the estimated location of the mobile robot 100, the odometry data, and the at least one visual measurement.

The map of landmarks 1040 can include a map of the environment surrounding the mobile robot 100 and the position of landmarks relative to the location of the mobile robot 100 within the environment. The map of landmarks 1040 may include various pieces of information describing each landmark in the map, including (but not limited to) references to data describing the landmarks within the landmarks database.

The behavioral control application 1030 controls the actuation of different behaviors of the mobile robot 100 based on the surrounding environment and the state of the mobile robot 100. In some embodiments, as images are captured and analyzed by the VSLAM application 1035, the behavioral control application 1045 determines how the mobile robot 100 should behave based on the understanding of the environment surrounding the mobile robot 100. The behavioral control application 1045 may select from a number of different behaviors based on the particular characteristics of the environment and/or the state of the mobile robot 100. The behaviors may include, but are not limited to, a wall following behavior, an obstacle avoidance behavior, an escape behavior, among many other primitive behaviors that may be actuated by the robot.

In several embodiments, the input/output interface provides devices such as (but not limited to) sensors with the ability to communicate with the processor and/or memory. In other embodiments, the input/output interface provides the mobile robot with the ability to communicate with remote computing devices via a wired and/or wireless data connection. Although various robot controller configurations are described above with reference to FIG. 10, the mobile robot 100 can be configured using any of a variety of robot controllers as appropriate to the requirements of specific applications including robot controllers configured so that the robot behavioral controller application is located on disk or some other form of storage and is loaded into memory at runtime and/or where the robot behavioral controller application is implemented using a variety of software, hardware, and/or firmware.

Error Reduction in Odometry Data

The reliability of the odometry data provided by the optical odometry sensor system 205 may vary based on various factors, including (but not limited to) the type of surface being traversed, the illumination of the surface, the speed of the mobile robot across the surface, and/or the frame rate of the optical odometry camera 440. The mobile robot 100 may obtain additional odometry data using one or more different type of sensors, including (but not limited to) one or more wheel odometry sensors. In one optional configuration, the mobile robot 100 may compare the odometry data captured by the optical odometry sensor system 205 against the odometry data captured by wheel odometry sensors in order to ascertain the reliability of the optical odometry data and/or to provide more reliable odometry data to other processes.

In certain embodiments, the mobile robot may rely primarily on the optical odometry sensor system 205 to capture odometry data. However, when the optical odometry sensor system 205 is unable to capture odometry data with a satisfactory level of reliability, the mobile robot 100 may also use the wheel odometry sensor system to gather the odometry data. For example, if a the mobile robot 100 travels across a ceramic tile floor with too few trackable features to achieve a reliable SQUAL value, the optical odometry data may not be as accurate as data captured by other types of sensors including, for example, a wheel odometry sensor. A processes that can optionally be utilized by the mobile robot 100 to obtain odometry data using information captured by different types of sensors are illustrated in FIGS. 11 and 12.

Figure 11:
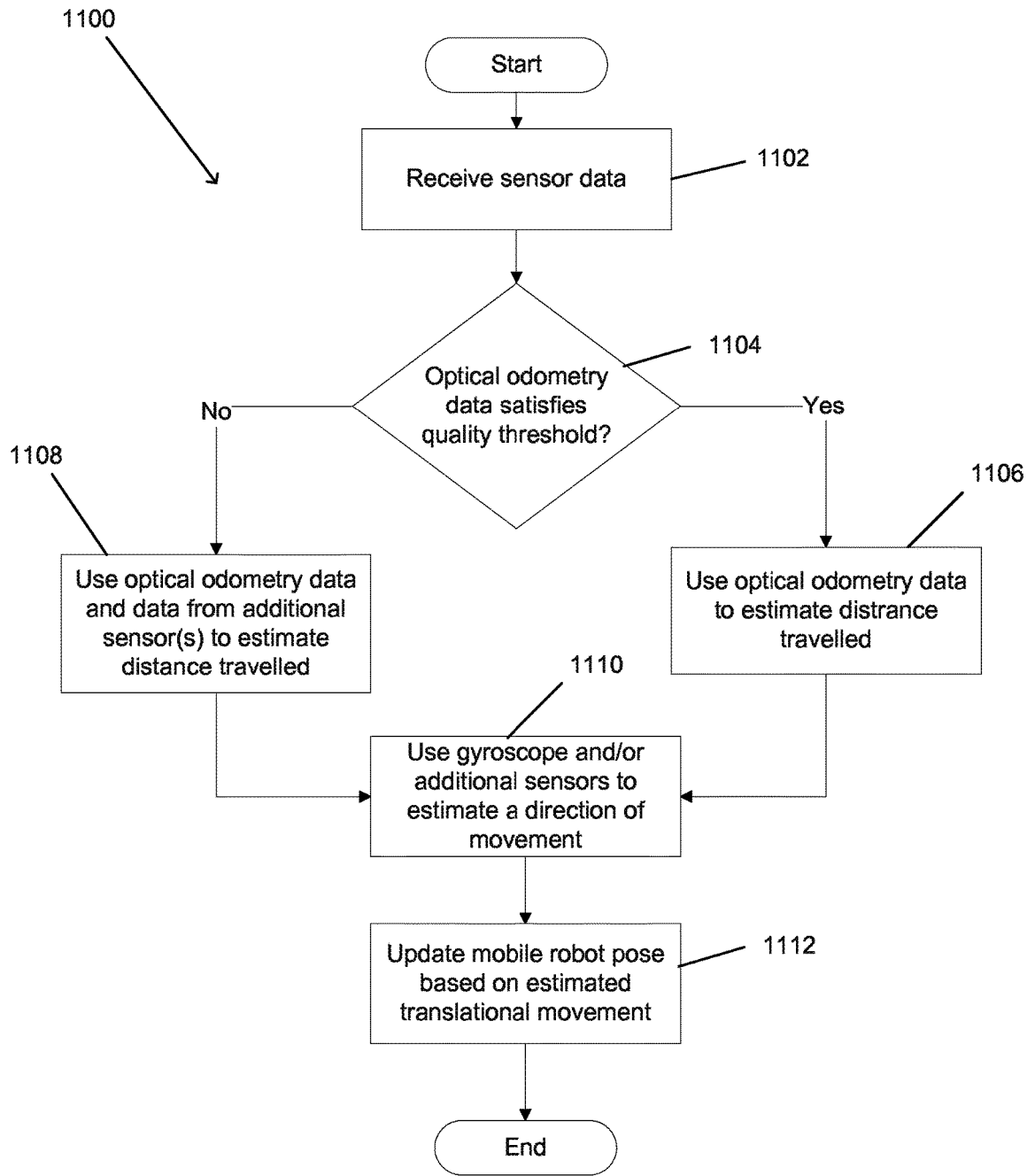
FIG. 11 is a flow chart illustrating a process for using odometry data captured by different types of odometry sensors.
Figure 12:
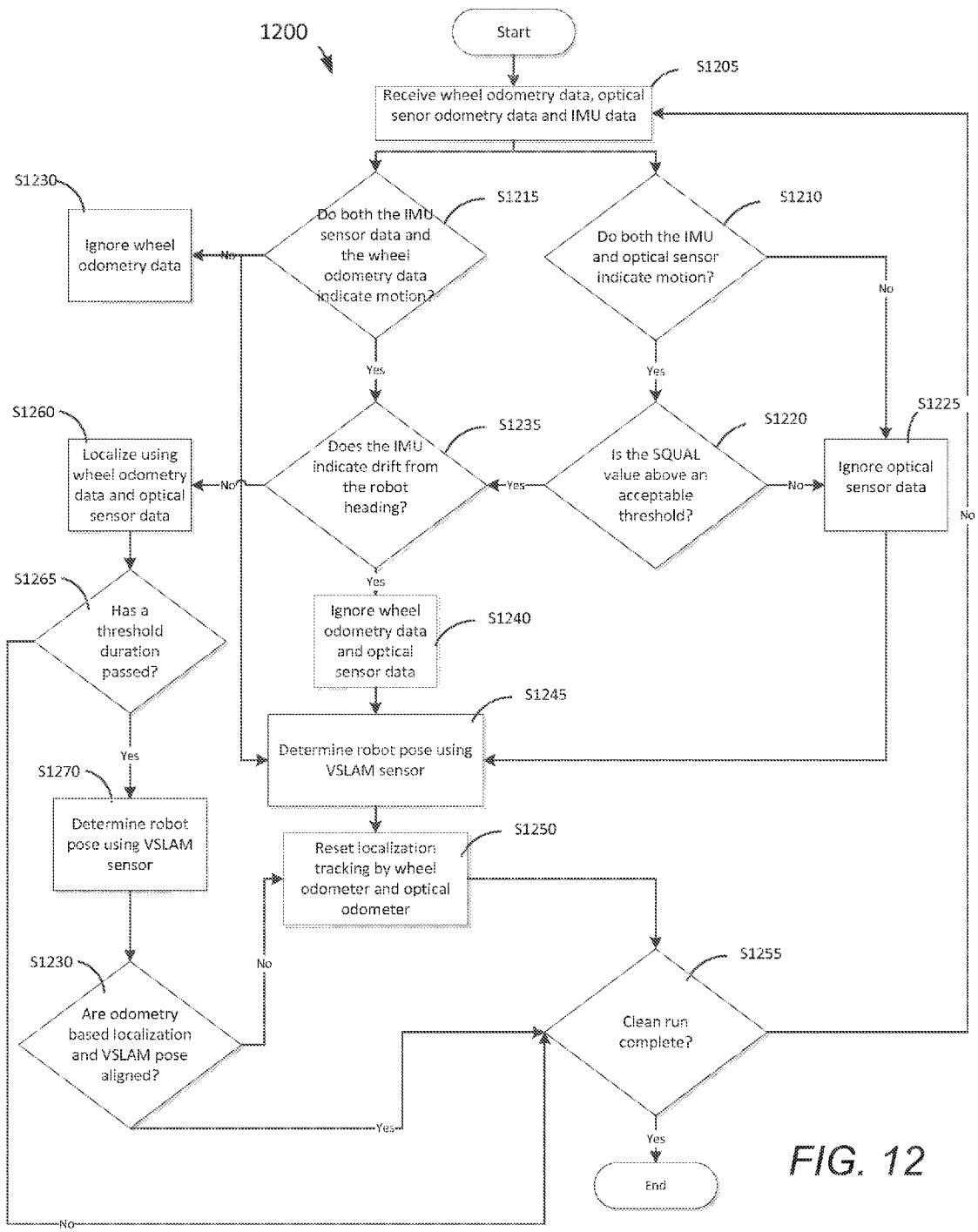
FIG. 12 is a flow chart illustrating a process for using odometry data captured by different types of odometry sensors.

In the implementation of FIG. 11, the process 1100 receives (1102) sensor data from one or more different sensors. The sensors may include (but is not limited to) an optical odometry sensor system, and/or a wheel odometry sensor, a machine vision sensor. The mobile robot 100 determines (1104) whether the optical odometry data captured by the optical odometry sensor system 205 satisfies a quality threshold. In some embodiments, the optical odometry sensor system 205 provides a quality metric with the odometry data that provides an estimate of the reliability of the data. The quality metric may be based on the surface quality over which the mobile robot is traversing, based on, for example, whether the sensor has features to track.

If the optical odometry data satisfies the quality threshold, the mobile robot 100 can use (1106) the optical odometry data to estimate a distance travelled. If the optical odometry data does not satisfy the quality threshold, the mobile robot 100 can use (1108) the optical odometry data and data from one or more additional sensor(s) to estimate the distance travelled. The additional sensor may be a wheel odometry sensor that captures odometry data based on the rotation of the wheels of the mobile robot 100 across the environment. In one configuration, the wheel odometry data is used to verify the optical odometry data and the optical odometry data is utilized when confirmed by the wheel odometry data. When the wheel odometry data does not confirm the optical odometry data, then the process may discard all odometry data and/or rely upon the wheel odometry data as appropriate to the requirements of the specific application.

In the illustrated process, the mobile robot 100 uses (1110) a gyroscope and/or additional sensors to estimate a direction of movement of the mobile robot 100 through the environment and updates (1112) the mobile robot pose based on the estimated extent of the translation and direction of the movement.

In the implementation of FIG. 12 showing a process 1200 for fusing two or more sensor readings to determine the location of a robot 100 within an operating environment, the mobile robot 100 receives S1205 high frequency sensor readings from the wheel odometry and IMU and/or optical odometry and IMU. In implementations, the robot 100 comprises an IMU, such as a 6 axis IMU combining a 3-axis accelerometer with a 3-axis gyrometer (hereafter referred to as "gyro"). By comparing S1210, S1215 the frequently sampled wheel odometry and mouse odometry data with IMU data, the robot 100 determines whether the wheel odometers and mouse sensors are accurately reporting movement and can be considered in determining robot location within an operating environment. For example, if a robot 100 is traveling over a smooth surface with too few features for the optical sensor to track for detecting movement accurately, the sensor will produce a low SQUAL value. The process 1200 determines S1220 whether the SQUAL value is below a threshold and if so, the robot 100 will ignore S1225 the optical sensor data and default to one or more of other sensor readings to localize the robot 100 within the environment. In implementations, if the SQUAL value is low, the robot 100 issues an audible and/or visual signal to a user that FOD may be obstructing the lens of the optical odometry camera 440 and prompts the user to clean out the recess 210.

Similarly, if both the IMU sensor data and wheel odometry data fail to indicate motion or if the sensors conflict and the IMU data indicates that the robot 100 is not moving while the wheel odometer indicates movement (e.g., when the wheels are slipping on a surface with low traction or when the robot is beached or high centered), the robot 100 ignores S1230 the wheel odometry data in making a determination of localization. If the IMU and wheel odometer both indicate that the robot 100 is moving, the robot 100 checks S1235 whether the IMU indicates drift from an initial robot heading.

If the IMU indicates drift, the wheel odometry data will be unreliable for calculating a location based on distance travelled. The robot 100 ignores S1240 the wheel odometry data and optical sensor data and adjusts that localization with a global determination of robot pose within the environment using more slowly sampled VSLAM data. In many implementations, the robot 100 has an imaging sensor configured to collect images for VSLAM, the imaging sensor being a camera 120 having a field of view aimed at a particular region of static landmarks in the height range of 3-8 feet from the floor surface. By supplementing the high frequency odometry data with global sensor readings, the robot 100 determines S1245 an accurate pose within a global coordinate system and/or a persistent map of the environment and ignores, adjusts, and/or resets S1250 the high frequency local position data if there is a discrepancy in localization once pose is determined. The process 1200 then checks S1225 whether the robot mission, (e.g., a cleaning run) is complete and returns to monitoring the wheel odometry sensor data, optical odometry data and IMU data.

If the IMU indicates S1235 no drift after determining that the wheel odometers correctly indicate movement and the optical sensor indicates motion while tracking a sufficient number of tracking features on the floor surface, the process 1200 running on the robot 100 will localize S1260 the robot 100 using both wheel odometry data and optical sensor data. In some implementations, the process 1200 includes an intermittent global localization check to insure that the robot has not drifted significantly despite input from the IMU. The global localization check first determines S1265 whether a threshold duration has passed. If not, the process checks S1225 whether the robot mission, (e.g., a cleaning run) is complete and returns to monitoring the wheel odometry sensor data, optical odometry data and IMU data. If a threshold duration has passed, the process 1200 determines S1270 the pose of the robot 100 using the VSLAM sensor, as described above. If the process determines that the odometry based localization and VSLAM pose are aligned, the process 1200 then checks S1225 whether the robot mission, (e.g., a cleaning run) is complete and returns to monitoring the wheel odometry sensor data, optical odometry data and IMU data. If the process 1200 determines that the odometry based localization and VSLAM pose are not aligned, the robot 100 ignores, adjusts, and/or resets S1250 the high frequency local position data.

While the above contains descriptions of many specific optional aspects of the invention, these should not be construed as limitations on the scope of the invention, but rather as an example of different configurations thereof. Accordingly, the scope of the invention should be determined not by the examples illustrated, but by the appended claims and their equivalents.

What is claimed is:

1. A mobile robot configured to navigate an operating environment, comprising:
    a body containing:
        a drive configured to translate the mobile robot in a direction of motion;
        at least one processor;
        memory containing a navigation application;
        an optical odometry sensor system positioned within a recessed structure on an underside of the body and configured to output optical odometry data, where the optical odometry sensor system comprises an optical odometry camera positioned at a height between 40 to 60 mm from a floor surface, the optical odometry camera including a telecentric lens configured to capture images of a tracking surface beneath the body and having a depth of field in which objects are in focus at distances including distances between negative 5 to 20 mm from a bottom surface of the body; and
        a gyroscope configured to output gyroscope measurement data.

2. The mobile robot of claim 1, wherein the navigation application directs the at least one processor to:
    actuate the drive and capture:
        the optical odometry data from the optical odometry sensor system; and
        the gyroscope measurement data from the gyroscope;
    estimate a distance travelled using the captured optical odometry data;
    estimate a direction travelled using the gyroscope measurement data; and
    update a pose estimate using the estimated distance travelled and direction travelled.

3. The mobile robot of claim 2, wherein the navigation application directs the at least one processor to estimate the distance travelled using captured wheel odometry data.

4. The mobile robot of claim 2, wherein the navigation application directs the at least one processor to compare the pose estimate against a pose determination calculated using imaged features detected by a camera mounted under a top surface of the mobile robot.

5. The mobile robot of claim 4, wherein the navigation application directs the at least one processor to reset the pose estimate if the pose determination indicates the mobile robot has drifted from a heading.

6. The mobile robot of claim 1, further comprising a plurality of lighting elements disposed about the telecentric lens and comprising a plurality of LEDs for illuminating the tracking surface.

7. The mobile robot of claim 6, wherein each of the plurality of LEDs are positioned at an acute angle relative to an optical axis of the optical odometry camera.

8. The mobile robot of claim 6, wherein the plurality of LEDs comprises at least four LEDs positioned at different positions around the optical odometry camera.

9. The mobile robot of claim 8, wherein pairs of LEDs are positioned on opposite sides relative to the optical odometry camera.

10. The mobile robot of claim 8, wherein the plurality of LEDs are positioned in a spiral pattern offset from an optical axis of the optical odometry camera.

11. The mobile robot of claim 1, wherein the drive comprises a plurality of wheels and the mobile robot further comprises a wheel odometry sensor system that outputs wheel odometry data based upon rotation of each of the plurality of wheels.

12. The mobile robot of claim 3, wherein:
    the optical odometry sensor system also outputs a quality measure, where the quality measure indicates a reliability of optical odometry data; and the navigation application directs the at least one processor to estimate the distance travelled using the captured optical odometry data, when a quality measure satisfies a threshold.

13. The mobile robot of claim 12, wherein the quality measure is based on a number of valid features detected in an image.

14. The mobile robot of claim 1, wherein the recessed structure has an opening with a diameter between 10 mm and 40 mm.

15. The mobile robot of claim 1, wherein the body comprises a top surface that is at most 110 mm from the floor surface.

16. The mobile robot of claim 1, wherein the depth of field of the optical odometry camera is proportional to a focal length of the optical odometry camera.

17. The mobile robot of claim 16, wherein the focal length of the optical odometry camera is between 15 to 25 mm.

18. The mobile robot of claim 1, further comprising four LEDs disposed about the telecentric lens for illuminating the tracking surface.

* * * * *

UNITED STATES PATENT AND TRADEMARK OFFICE
CERTIFICATE OF CORRECTION

| | |
|---|---|
| PATENT NO. | : 9,744,670 B2 |
| APPLICATION NO. | : 14/856501 |
| DATED | : August 29, 2017 |
| INVENTOR(S) | : Romanov et al. |

It is certified that error appears in the above-identified patent and that said Letters Patent is hereby corrected as shown below:

In the Specification

Column 7, Line 33: Please correct "and 0 components" to read -- and θ components --

Signed and Sealed this
Twenty-second Day of May, 2018

Andrei Iancu
*Director of the United States Patent and Trademark Office*